US008582822B2

(12) United States Patent
Iwasaki et al.

(10) Patent No.: US 8,582,822 B2
(45) Date of Patent: Nov. 12, 2013

(54) MOVING OBJECT DETECTION APPARATUS AND MOVING OBJECT DETECTION METHOD

(75) Inventors: Masahiro Iwasaki, Kyoto (JP); Kunio Nobori, Osaka (JP); Ayako Komoto, Osaka (JP)

(73) Assignee: Panasonic Corporation, Osaka (JP)

( * ) Notice: Subject to any disclaimer, the term of this patent is extended or adjusted under 35 U.S.C. 154(b) by 133 days.

(21) Appl. No.: 13/170,354

(22) Filed: Jun. 28, 2011

(65) Prior Publication Data

US 2011/0255747 A1    Oct. 20, 2011

Related U.S. Application Data

(63) Continuation of application No. PCT/JP2010/007480, filed on Dec. 24, 2010.

(30) Foreign Application Priority Data

Dec. 28, 2009 (JP) ................................. 2009-298301

(51) Int. Cl.
*G06K 9/00* (2006.01)

(52) U.S. Cl.
USPC .......................................... 382/107; 382/173

(58) Field of Classification Search
USPC .................. 382/103, 107, 173, 224, 227, 286
See application file for complete search history.

(56) References Cited

U.S. PATENT DOCUMENTS

| 8,437,549 B2 | 5/2013 | Iwasaki et al. ................ 382/173 |
| 2002/0176625 A1 | 11/2002 | Porikli et al. ................ 382/173 |
| 2010/0245360 A1* | 9/2010 | Song et al. ..................... 345/441 |
| 2011/0013840 A1 | 1/2011 | Iwasaki et al. ................ 382/173 |
| 2011/0228987 A1* | 9/2011 | Iwasaki et al. ................ 382/107 |

FOREIGN PATENT DOCUMENTS

| JP | 3-073075 A | 3/1991 |
| JP | 8-214289 A | 8/1996 |
| JP | 11-066319 A | 3/1999 |
| JP | 2004-246436 A | 9/2004 |
| WO | WO 2009/112790 A1 | 9/2009 ................ G06T 7/20 |

OTHER PUBLICATIONS

J. Tenenbaum et al., "A Global Geometric Framework for Nonlinear Dimensionality Reduction", Science, vol. 290, Dec. 22, 2000, pp. 2319-2322.

(Continued)

*Primary Examiner* — Andrew W Johns
(74) *Attorney, Agent, or Firm* — Wenderoth, Lind & Ponack, L.L.P.

(57) ABSTRACT

A moving object detection apparatus includes: an image input unit which receives a plurality of pictures included in video; a trajectory calculating unit which calculates a plurality of trajectories from the pictures; a subclass classification unit which classifies the trajectories into a plurality of subclasses; an inter-subclass approximate geodetic distance calculating unit which calculates, for each of the subclasses, an inter-subclass approximate geodetic distance representing similarity between the subclass and another subclass, using an inter-subclass distance that is a distance including a minimum value of a linear distance between each of trajectories belonging to the subclass and one of trajectories belonging to the other subclass; and a segmentation unit which performs segmentation by determining, based on the calculated inter-subclass approximate geodetic distance, a set of subclasses including similar trajectories as one class.

21 Claims, 25 Drawing Sheets

(56) References Cited

OTHER PUBLICATIONS

Vin de Silva et al., "Global Versus Local Methods in Nonlinear Dimensionality Reduction", Neural Information Processing Systems 15, pp. 705-712, 2002.
Vin de Silva et al., "Sparse Multidimensional Scaling using Landmark Points", Technical Report, Stanford University, Jun. 30, 2004, pp. 1-41.
P. Anandan, "A Computational Framework and an Algorithm for the Measurement of Visual Motion", International Journal of Computer Vision, vol. 2, pp. 283-310, 1989.
V. Kolmogoroy et al., "Computing Visual Correspondence with Occlusions via Graph Cuts", International Conference on Computer Vision, 2001, pp. 1-37.
R. Duda et al., "Pattern Classification", Second Edition, John Wiley & Sons, Inc., 2001, pp. 550-556.
E.W. Dijkstra, "A Note on Two Problems in Connexion with Graphs", Numerische Mathematik, 1959, pp. 269-271.
A. Azran et al., "Spectral Methods for Automatic Multiscale Data Clustering", Proc. IEEE Computer Society Conference on Computer Vision and Pattern Recognition, 2006, pp. 1-8.
X.Ren et al., "Learning a Classification Model for Segmentation, International Conference on Computer Vision", vol. 1, 2003, pp. 10-17.
Extended European Search Report issued Jun. 28, 2013 in corresponding European Application No. 10840760.2.
Gianluca Antonini et al., "Counting Pedestrians in Video Sequences Using Trajectory Clustering", IEEE Transactions on Circuits and Systems for Video Technology, vol. 16, No. 8, Aug. 1, 2006, p. 1008-1020, XP008093708.
Eunjung Han et al., "Automatic Cartoon Image Re-authoring Using SOFM", Multimedia Content Representation, Classification and Security Lecture Notes in Computer Science, Berlin, DE, Jan. 1, 2006, p. 403-409, XP019040419.
Minkook Cho et al., "Nonlinear Dimension Reduction using ISOMap based on Class Information", Proceedings of International Joint Conference on Neural Networks, Atlanta, GA, USA, Jun. 14-19, 2009, p. 566-570, XP031498492.
Yiming Wu et al., "An Extended Isomap Algorithm for Learning Multi-Class Manifold", Proceedings of the Third International Conference on Machine Learning and Cybernetics, Shanghai, China, Aug. 26-29, 2004, p. 3429-3433, XP010760173.
Gabriel J. Brostow et al., "Unsupervised Bayesian Detection of Independent Motion in Crowds", Proceedings of the 2006 IEEE Computer Society Conference on Computer Vision and Pattern Recognition, New York, NY, USA, Jun. 17-22, 2006, p. 594-601, XP010922870.
Brendan Morris et al., "Learning Trajectory Patterns by Clustering: Experimental Studies and Comparative Evaluation", IEEE Conference on Computer Vision and Pattern Recognition, Jun. 20, 2009, p. 312-319, XP031607086.
Dan Buzan et al., "Extraction and Clustering of Motion Trajectories in Video", Proceedings of the 17th International Conference on Pattern Recognition, Cambridge, UK, Aug. 23-26, 2004, p. 521-524, XP010724420.
Manolis Wallace et al., "Robust, Generalized, Quick and Efficient Agglomerative Clustering", Proceedings of 6th International Conference on Enterprise Information Systems, Apr. 14, 2004, p. 409-416, XP55065534.
Fabio Cuzzolin et al., "Robust Spectral 3D-Bodypart Segmentation Along Time", Human Motion: A Understanding, Modeling, Capture and Animation, Lecture Notes in Computer Science, Berlin, DE, Oct. 20, 2007, p. 196-211, XP019081629.
Odest Chadwicke Jenkins et al., "A Spatio-temporal Extension to Isomap Nonlinear Dimension Reduction", ACM International Conference Proceeding Series: Proceedings of the 21st International Conference on Machine Learning, New York, USA, Jan. 1, 2004, p. 1-8, XP002507628.

\* cited by examiner

FIG. 4
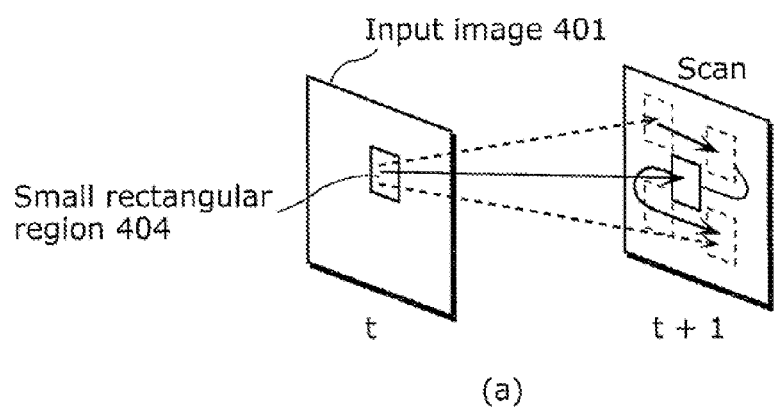
(a)
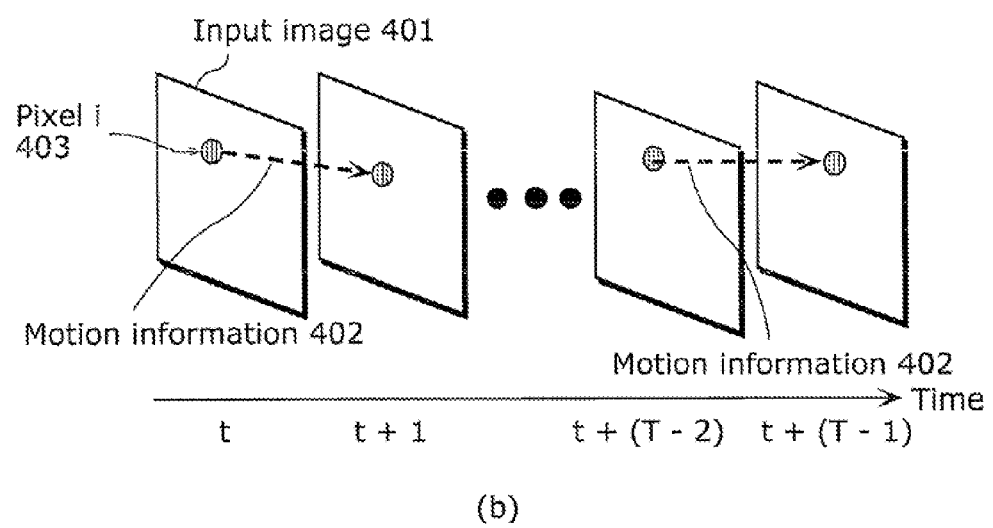
(b)

FIG. 5
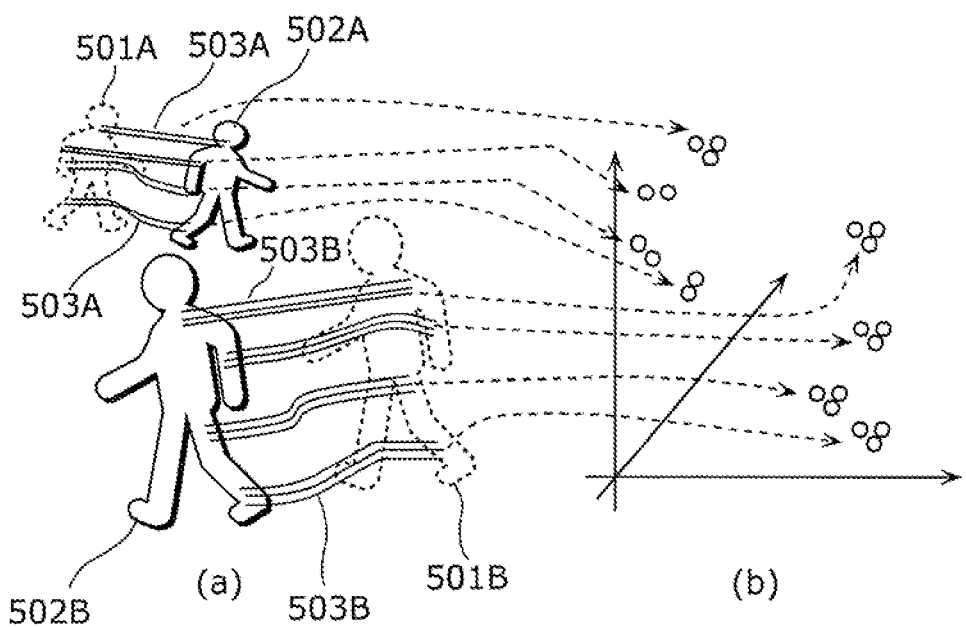
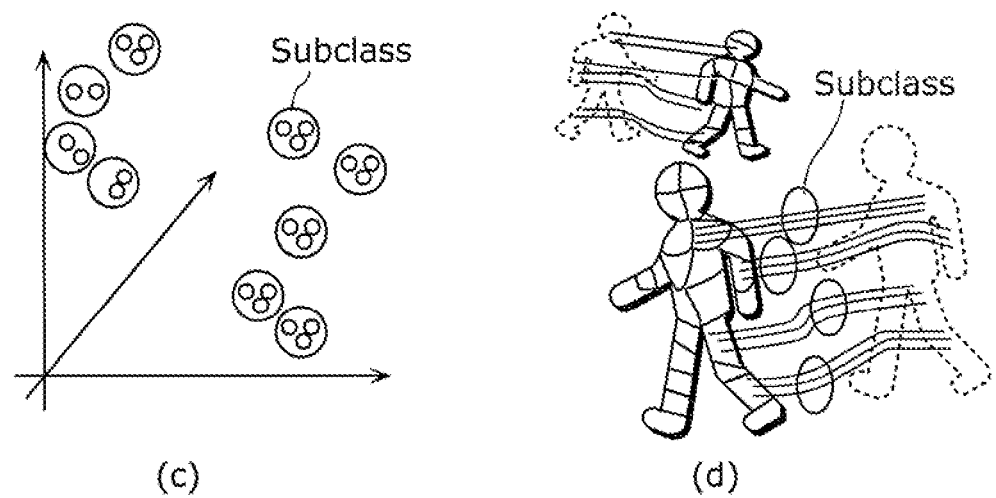

(a) Subclass (b) Dimensionally-reduced space (c) Result of class determination (d) Result of trajectory detection FIG. 12
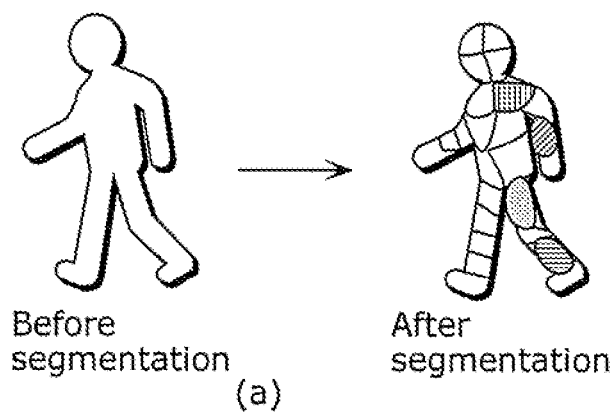
Before segmentation → After segmentation
(a)
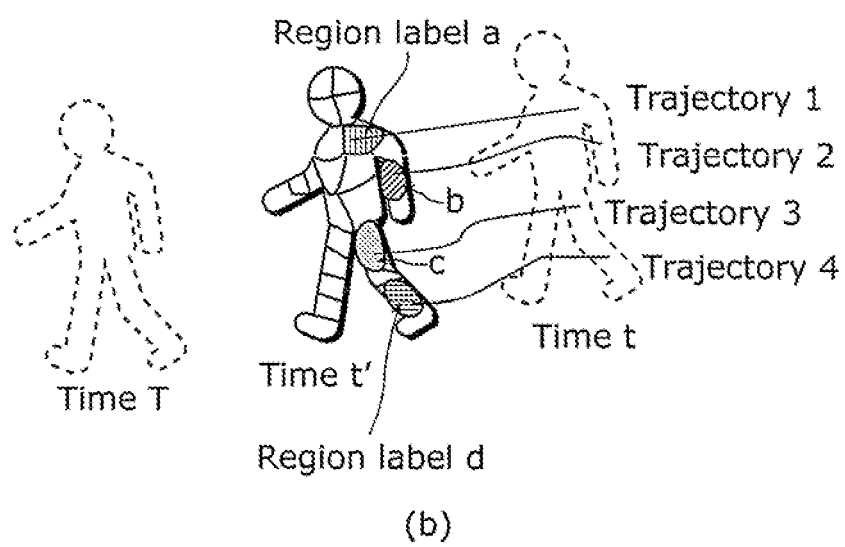
(b)

FIG. 14
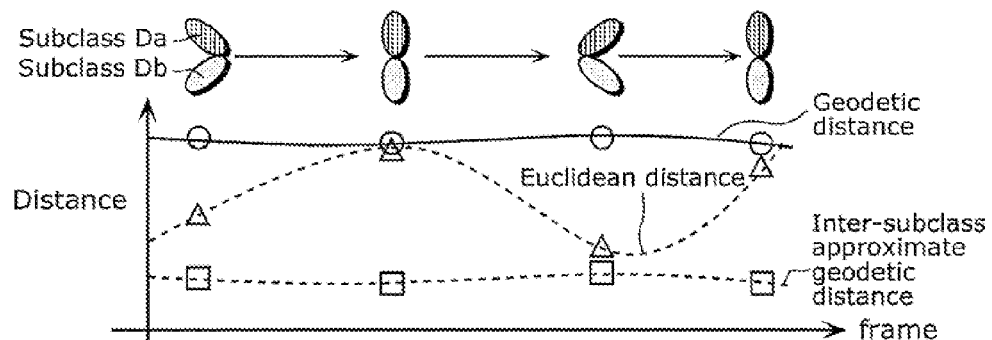
(a)
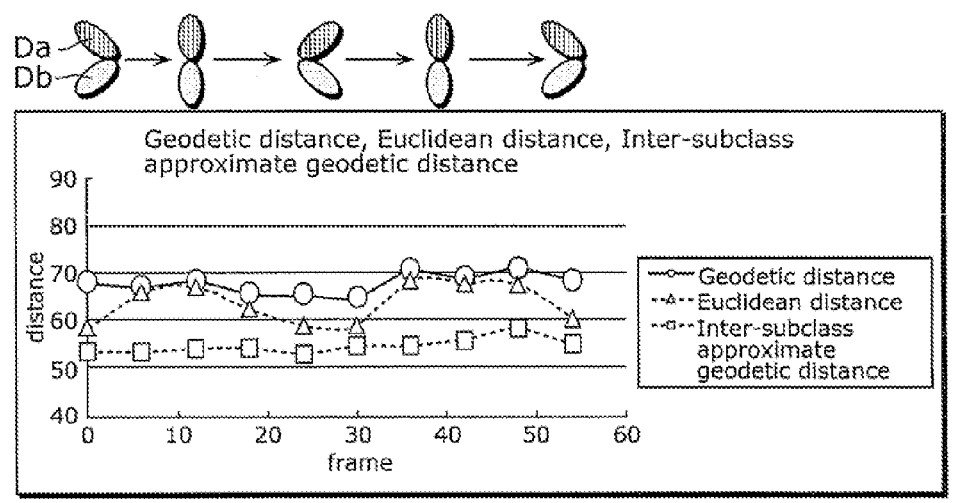
(b)

FIG. 15
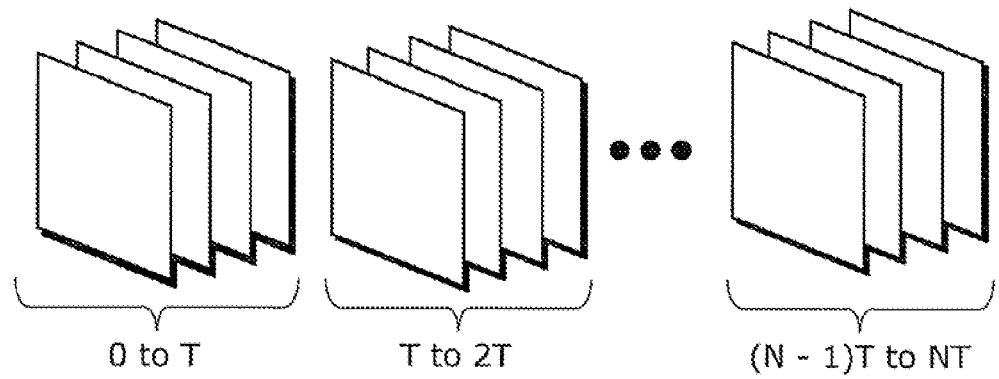
(a) Processing example of image input step (1)
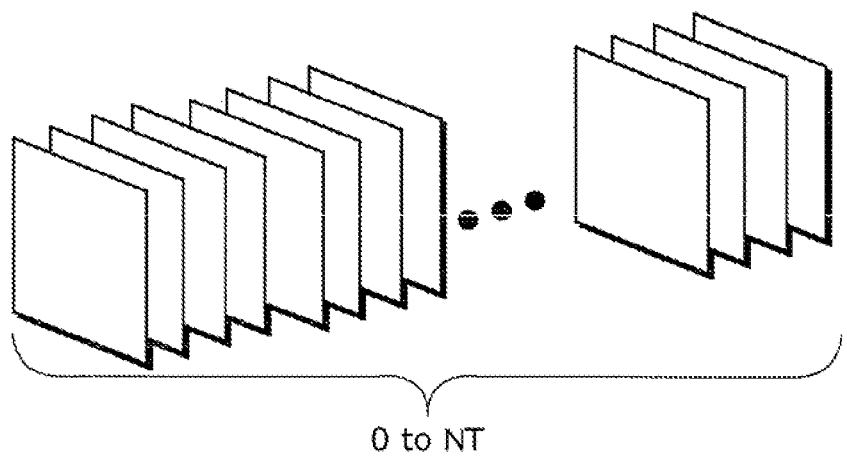
(b) Processing example of image input step (2)

FIG. 17

| Label | Pixel value and pixel position | Pixel value trajectory information |
|---|---|---|
| $\theta_1$ | Position and value of pixel belonging to $\theta_1$ in image at time T | $u^1_T, v^1_T, u^1_{T+1}, v^1_{T+1}, \cdots, u^1_{T+t}, v^1_{T+t}$ |
| $\theta_2$ | Position and value of pixel belonging to $\theta_2$ in image at time T | $u^2_T, v^2_T, u^2_{T+1}, v^2_{T+1}, \cdots, u^2_{T+t}, v^2_{T+t}$ |

<Header information>
Picture size (X, Y) Number of pictures (T)
Number of trajectories (N) Number of subclasses (S)

<Body information>
Picture size (X*Y, T pictures)
Trajectory vector with subclass label (2T + 1 dimension, N trajectories)
Inter-subclass approximate geodetic distance matrix (S×S)

Number of trajectories N

Number of subclasses S

FIG. 27

| | | | |
|---|---|---|---|
| Header information | Picture size (X) | | 640 |
| | Picture size (Y) | | 480 |
| | Number of pictures (T) | | 4 |
| | Number of trajectories (N) | | 5 |
| | Number of subclasses (S) | | 3 |
| Body information | Image | 1 | Image data of the first image |
| | | 2 | Image data of the second image |
| | | 3 | Image data of the third image |
| | | 4 | Image data of the fourth image |
| | Trajectory vector with subclass label | 1 | a a1x1 a1y1   a1x2 a1y2   a1x3 a1y3   a1x4 a1y4 |
| | | 2 | a a2x1 a2y1   a2x2 a2y2   a2x3 a2y3   a2x4 a2y4 |
| | | 3 | b b1x1 b1y1   b1x2 b1y2   b1x3 b1y3   b1x4 b1y4 |
| | | 4 | b b2x1 b2y1   b2x2 b2y2   b2x3 b2y3   b2x4 b2y4 |
| | | 5 | c c1x1 c1y1   c1x2 c1y2   c1x3 c1y3   c1x4 c1y4 |
| | Inter-subclass approximate geodetic distance matrix | (a,a) | $f_{aa}^{Intra}$ |
| | | (a,b) | $g'_{ab}$ |
| | | (a,c) | $g'_{ac}$ |
| | | (b,b) | $f_{bb}^{Intra}$ |
| | | (b,c) | $g'_{bc}$ |
| | | (c,c) | $f_{cc}^{Intra}$ |

MOVING OBJECT DETECTION APPARATUS AND MOVING OBJECT DETECTION METHOD

CROSS REFERENCE TO RELATED APPLICATION

This is a continuation application of PCT application No. PCT/JP2010/007480 filed on Dec. 24, 2010, designating the United States of America.

BACKGROUND OF THE INVENTION (1) Field of the Invention

The present invention relates to an image processing technique of detecting a moving object by specifying a region in the moving object in an image. Particularly, the present invention relates to a moving object detection apparatus or the like which detects a moving object at high speed based on motion information in video even when the moving object to be detected moves changing shape like a person.

(2) Description of the Related Art

Conventionally, research and development has been widely promoted on, a region extraction method for detecting a moving object by extracting, from an image including a moving object (hereinafter, simply referred to as a "moving object"), a region of the moving object within the image. Particularly, in the case of a human moving object, extracting a moving object region is a basic technique commonly used for: focus control image improvement processing in a digital camcorder or a digital still camera; a driving safety support system for vehicles; or collision avoidance control to avoid collision against a person or alarming using a robot.

Among techniques for extracting a region of the moving object in the image, a method generally used is extracting a candidate moving object region from the image, then evaluating similarity of the extracted moving object region candidate with respect to a moving object model that is prepared in advance, and extracting a region having high similarity to a moving object region.

Furthermore, for extracting a moving object which walks changing shape, such as a walking person or the like, another method using a moving object model considering shape change is used. For example, in the technique disclosed in Patent Reference 1, a silhouette image of the moving object is extracted as a moving region candidate from each of a plurality of images. Then, Patent Reference 1 discloses a technique of evaluating similarity between a model related to the shape change of the previously parameterized moving object and the extracted silhouette image, and estimating parameters of a region having high similarity and the model corresponding to the region. Since this allows applying the parameterized model to a human figure that moves periodically changing shape, it is possible to perform extraction of the moving object region.

In addition, in the technique disclosed in Non-Patent Reference 1, with input of images each including a fixed moving object captured from a plurality of viewpoints, a Euclidean distance between a vector made up of arrangements of pixel values in each image and a vector made up of arrangements of pixel values in another image is calculated. Then, Non-Patent Reference 1 discloses a technique of transforming the calculated Euclidean distance into a geodetic distance, and then performing dimensional reduction so that images captured from similar viewpoints are projected close to each other on a two-dimensional space. Here, it is shown that compared to a conventional linear dimensional reduction method such as Principal Component Analysis (PCA), the technique allows performing lower-dimensional reduction through geodetic distance transformation and further allows processing the data that is nonlinearly distributed.

Patent Reference 1: Japanese Unexamined Patent Application Publication No. 8-214289

Non-Patent Reference 1: Joshua Tenenbaum, Vin de Silva and John Langford, "A Global Geometric Framework for Nonlinear Dimensionality Reduction", Science, Vol. 290, pp. 2319-2322, 22 December, 2000.

SUMMARY OF THE INVENTION

However, the conventional technique of region extraction as described above has a problem of not allowing accurate extraction of a moving object in such cases as where the moving object is partially occluded by another moving object or where moving objects significantly different from each other in size are included.

According to the conventional region extraction method as represented by Patent Reference 1, it is necessary to extract a candidate moving object region from the image. In performing this, unless the moving object region is not appropriately extracted, it is not possible to correctly apply the model obtained by parameterizing the moving object, to the moving object region candidate. Particularly, in the scenes as described above, it is difficult to appropriately extract the moving region candidate. Furthermore, even if the moving object region candidate is appropriately extracted, there is yet another problem as follows. Specifically, when the moving object is an articulated object such as a person, since change or variation in the image derived from various postures and sizes of the moving object is so significant that a vast amount of parameters are required for parameterizing the moving object model. This induces misplacement of the model. This causes, for example, a problem of not allowing accurate detection of the moving object, such as erroneously detecting a plurality of moving objects as one moving object or erroneously detecting, as a moving object, a region including no moving object to be extracted.

On the other hand, according to the moving object detection method represented by Non-Patent Reference 1, it is possible to project image data onto a low-dimensional space that is dimensionally-reduced efficiently, by nonlinearizing an input of the distance between images. With this, the data is expected to have resistance to noise. Furthermore, it is possible to efficiently represent the data that is continuously and nonlinearly distributed, according to geodetic distance transformation and dimensional reduction. However, the principal object of Non-Patent Reference 1 is to visualize similarity between images by projecting a plurality of images onto a low-dimensional space, and Non-Patent Reference 1 fails to disclose a method of accurately detecting the moving object in response to the variation of postures of an articulated object changing shape such as a person.

Here, in Non-Patent Reference 1, when N is a total number of data to be processed, it is necessary to perform geodetic distance transformation and dimensional reduction using a matrix having the number of elements $N^2$. As a result, this is known to cause a problem of requiring a vast amount of calculation when the number of data N is large.

In contrast, Non-Patent References 2 and 3 disclose techniques of reducing the amount of calculation by setting, from data points, a smaller number of landmark points than the number of data points, and generating the matrix using the set landmark points and performing geodetic distance transformation and dimensional reduction.

Non-Patent Reference 2: Vin de Silva and Joshua B. Tenenbaum, "Global Versus Local Methods in Nonlinear Dimensionality Reduction", Neural Information Processing Systems 15, pp. 705-712, 2002

Non-Patent Reference 3: Vin de Silva and Joshua B. Tenenbaum, "Sparse Multidimensional Scaling using Landmark Points", Technical Report, Stanford University, June 2004

Thus, the inventor of the present invention has conceived a region extraction technique including units as described below, in order to solve the problem of failing to accurately perform the region extraction shown in Patent Reference 1. The region extraction apparatus using this region extraction technique includes: an image input unit; a motion analysis unit which calculates trajectories by detecting motions from images captured at different times and temporally concatenating the detected motions; a distance calculating unit which calculates a distance representing similarity between trajectories; and a segmentation unit which extracts a region by transforming the distance into a geodetic distance and classifying the trajectories based on the obtained geodetic distance.

Particularly, according to this region extraction technique, characteristics of allowing efficient representation of the data that is continuously and nonlinearly distributed are used as the characteristics derived from geodetic distance transformation processing as described in Non-Patent Reference 1.

However, this region extraction technique also has a problem that a vast amount of calculation is required for a large amount of input data, as with the technique disclosed in Non-Patent Reference 1. Furthermore, in the method of reducing the amount of calculation as represented by Non-Patent References 2 and 3, a data point that is present between each landmark point, which is the point not selected as the landmark point, is linearly interpolated using the landmark point. However, particularly, the motion of a moving object changing shape such as a person varies even if it belongs to the same moving object depending on a portion as motions are different between the head and the foot. For example, when the landmark point is in the head or foot, or when a joint is located between landmark points, linearly interpolating the point between the landmarks does not allow appropriately capturing the motion of the joint such as an arm or knee. For this reason, it is difficult to accurately extract the moving object in response to various posture changes in an articulated object changing shape such as a person. Furthermore, in a stage where the imaging object is not extracted in advance, it is difficult to appropriately set the landmark point for the articulated object such as a person.

Thus, an object of the present invention, conceived in view of the above problem, is to provide a moving object detection apparatus which can correctly perform region extraction at high speed, with a smaller amount of calculation, on an image including a moving object that moves changing shape such as a person, without being influenced by a posture or size of the moving object, while keeping the characteristics of the geodetic distance which can efficiently represent the data that is continuously and nonlinearly distributed.

To solve this problem, a moving object detection apparatus according to an aspect of the present invention is a moving object detection apparatus which detects a moving object in video by performing segmentation on an image to specify all or part of regions of the moving object in the video, and the moving object detection apparatus includes: an image input unit which receives input of a plurality of pictures included in the video; a trajectory calculating unit which calculates a plurality of trajectories by detecting, for each block including at least one pixel that is included in one of the received pictures, a motion of the block between two pictures included in the video, and concatenating detected motions for the plurality of pictures; a subclass classification unit which classifies the calculated trajectories into a plurality of subclasses each of which is a set of similar trajectories; an inter-subclass approximate geodetic distance calculating unit which calculates, for each of the subclasses, an inter-subclass approximate geodetic distance which represents similarity between the subclass and another one of the subclasses, using an inter-subclass distance that is a distance including a minimum value of a linear distance between each of trajectories belonging to the subclass and one of trajectories belonging to the other one of the subclasses; and a segmentation unit which performs segmentation by specifying, based on the calculated inter-subclass approximate geodetic distance, a set of subclasses including similar trajectories as a class.

With this configuration, the inter-subclass distance is calculated based on the linear distance calculated for all of the trajectory pairs, and the inter-subclass approximate geodetic distance is calculated using the inter-subclass distance. In addition, since the inter-subclass distance includes a minimum value of the linear distance between trajectories each belonging to a different subclass, the inter-subclass distance is not likely to change even in the case of change in the articulated object. Furthermore, since the class according to the present invention corresponds to a moving object region in the image, it is possible to detect the moving object as a result. Thus, it is possible to correctly perform region extraction at high speed, with a smaller amount of calculation, on an image including a moving object that moves changing shape such as a person, without being influenced by the posture or size of the moving object, while keeping the characteristics of the geodetic distance which allows efficiently representing the data that is continuously and nonlinearly distributed.

Note that the present invention can be realized not only as the moving object detection apparatus described above but also as a moving object detection method including, as steps, characteristic processing units included in the moving object detection apparatus, and also as a program causing a computer to execute each of the steps, as a non-transitory computer-readable recording medium such as a compact disc read-only memory (CD-ROM) on which the program is recorded, and so on. Note that it goes without saying that such a program can be distributed via a communication network such as the Internet.

According to the present invention, it is possible to correctly perform region extraction at high speed, with a smaller amount of calculation, on an image including a moving object that moves changing shape such as a person, without being influenced by the posture or size of the moving object, while keeping the characteristics of the geodetic distance which allows efficiently representing the data that is continuously and nonlinearly distributed.

Further Information about Technical Background to this Application

The disclosure of Japanese Patent Application No. 2009-298301 filed on Dec. 28, 2009 including specification, drawings and claims is incorporated herein by reference in its entirety.

The disclosure of PCT application No. PCT/JP2010/007480 filed on Dec. 24, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 4 is a diagram showing an example of processing performed by a trajectory calculating unit according to the first embodiment of the present invention;

FIG. 5 is a diagram showing an example of processing performed by a subclass classification unit according to the first embodiment of the present invention;

FIG. 12 is a diagram showing an example of processing performed by a subclass classification unit according to the second embodiment of the present invention;

FIG. 14 is a conceptual diagram showing characteristics of an inter-subclass approximate geodetic distance according to the third embodiment of the present invention;

FIG. 15 is a diagram showing an example of processing performed by an image input unit according to the third embodiment of the present invention;

FIG. 17 is a diagram showing an example of data to be recorded and transmitted according to the first variation of the first to the third embodiments of the present invention;

FIG. 27 is a diagram showing a specific example of information recorded on a recording medium.

DESCRIPTION OF THE PREFERRED EMBODIMENTS

Figure 1:
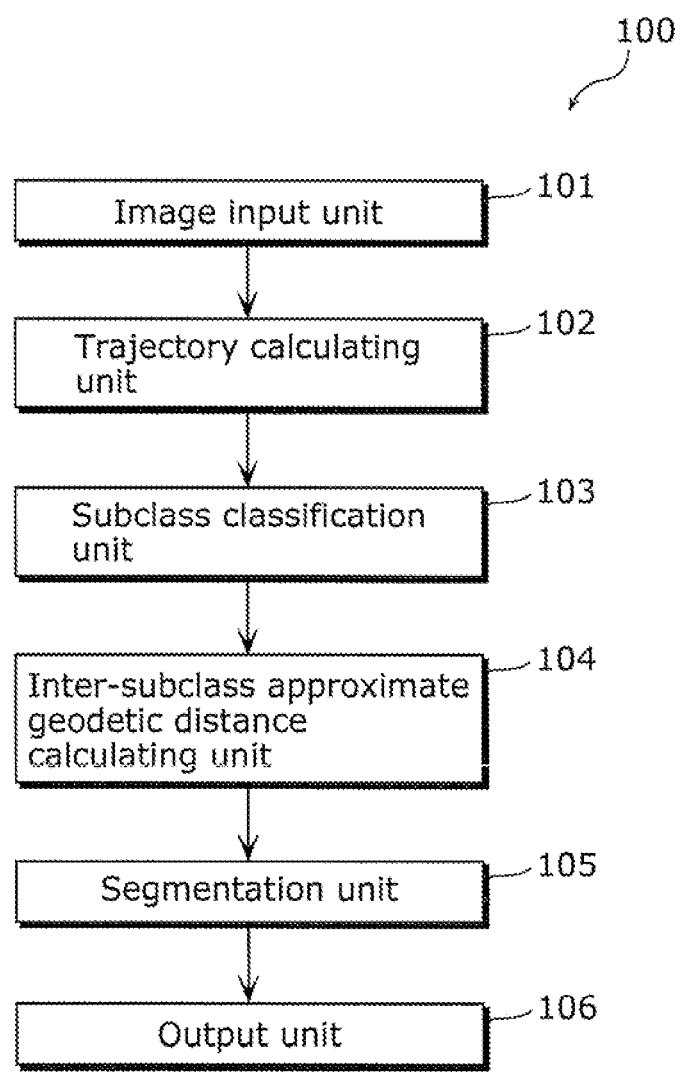
FIG. 1 is a diagram showing a basic configuration of a moving object detection apparatus according to a first embodiment of the present invention.

A moving object detection apparatus according to an embodiment of the present invention is a moving object detection apparatus which detects a moving object in video by performing segmentation on an image to specify all or part of regions of the moving object in the video, and the moving object detection apparatus includes: an image input unit which receives input of a plurality of pictures included in the video; a trajectory calculating unit which calculates a plurality of trajectories by detecting, for each block including at least one pixel that is included in one of the received pictures, a motion of the block between two pictures included in the video, and concatenating detected motions for the plurality of pictures; a subclass classification unit which classifies the calculated trajectories into a plurality of subclasses each of which is a set of similar trajectories; an inter-subclass approximate geodetic distance calculating unit which calculates, for each of the subclasses, an inter-subclass approximate geodetic distance which represents similarity between the subclass and another one of the subclasses, using an inter-subclass distance that is a distance including a minimum value of a linear distance between each of trajectories belonging to the subclass and one of trajectories belonging to the other one of the subclasses; and a segmentation unit which performs segmentation by specifying, based on the calculated inter-subclass approximate geodetic distance, a set of subclasses including similar trajectories as a class.

This allows the trajectories that are continuously and non-linearly distributed to be classified as one region according to similarity; thus, even in the case of detecting, as the moving object, an articulated object including a plurality of regions having different motions such as a person, such a moving object is determined as one region. As a result, an accurate region extraction is performed, so that the moving object is correctly detected. In other words, it is possible to correctly perform region extraction on the moving object that moves changing shape such as a person, to thereby reliably detect the moving object in the image at high speed.

In addition, by classifying the trajectories into subclasses and calculating an inter-subclass approximate geodetic distance instead of the geodetic distance representing similarity between trajectories, it is possible to calculate, particularly for movements of an object having joints, a distance having the same characteristics as in the case of calculating the geodetic distance with a smaller amount of calculation, thus allowing detecting the moving object at high speed. Furthermore, this does not require previously modeling or learning prior information regarding the moving object to be extracted such as shape information.

Preferably, the inter-subclass approximate geodetic distance calculating unit calculates, for each of the subclasses, as the inter-subclass approximate geodetic distance between the subclass and the other one of the subclasses, a distance that is a sum of: an intra-subclass distance representing similarity between trajectories belonging to the subclass; an intra-subclass distance representing similarity between trajectories belonging to the other one of the subclasses; and the inter-subclass distance between the subclass and the other one of the subclasses.

By using the inter-subclass distance and intra-subclass distance as the inter-subclass approximate geodetic distance, it is possible to approximate the geodetic distance with higher accuracy. With this, it is possible to correctly perform region extraction, with a smaller amount of calculation, on the moving object such as a person that moves changing shape, to thereby reliably detect the moving object in the image at high speed.

Here, the inter-subclass approximate geodetic distance calculating unit may calculate, for each of the subclasses, as the intra-subclass distance of the subclass, an average, mode, or median of a linear distance between the trajectories belonging to the subclass.

Furthermore, the segmentation unit may further calculate, as the inter-subclass approximate geodetic distance, a distance calculated by normalizing, using the intra-subclass distances, the inter-subclass approximate geodetic distance between two subclasses. By normalizing the inter-subclass approximate geodetic distance using the intra-subclass distance including a spatial size of the subclass, it is possible to detect, with higher accuracy, such a moving object changing size on the image.

In addition, the inter-subclass approximate geodetic distance calculating unit may calculate, when the minimum value is larger than a predetermined threshold, the inter-subclass approximate geodetic distance by performing nonlinearization for transforming the inter-subclass approximate geodetic distance into an infinite value.

In addition, the inter-subclass approximate geodetic distance calculating unit may compare an inter-subclass approximate geodetic distance between a first subclass and a second subclass, and a sum of an inter-subclass approximate geodetic distance between the first subclass and a third subclass and an inter-subclass approximate geodetic distance between the third subclass and the second subclass, and may calculate a smaller value as the inter-subclass approximate geodetic distance between the first subclass and the second subclass.

In addition, the segmentation unit may perform segmentation by specifying, based on temporal variation in the inter-subclass approximate geodetic distance, the set of subclasses including similar trajectories as the class representing a region. Thus, by determining whether or not to synthesize the subclass labels based on the temporal variation in the inter-subclass approximate geodetic distance, it is possible to detect movements of an articulated object or the like as one moving object.

Note that in order to synthesize the subclass labels based on the temporal variation, it is preferable that the segmentation unit perform segmentation by determining that the two subclasses belong to a same class, when a value indicating the temporal variation in the inter-subclass approximate geodetic distance between the two subclasses is equal to or less than a predetermined threshold for the temporal variation. This allows determining the subclasses as one moving object, such as movements of a joint or a rigid body, when the temporal variation in inter-subclass approximate geodetic distance is small.

Furthermore, in order not to synthesize the subclass labels based on the temporal variation, it is preferable that the segmentation unit perform segmentation by determining that the two subclasses belong to different classes, when a value indicating the temporal variation in the inter-subclass approximate geodetic distance between the two subclasses is larger than a predetermined threshold for the temporal variation. This allows determining the two subclasses to be separate moving objects when the temporal variation in the inter-subclass approximate geodetic distance is large.

In addition, the inter-subclass approximate geodetic distance calculating unit may determine, for each of the subclasses, as the inter-subclass distance between the subclass and the other one of the subclasses, an average of a predetermined number of distances selected, in ascending order, from among distances between the each of the trajectories belonging to the subclass and the one of the trajectories belonging to the other one of the subclasses. In addition, the inter-subclass approximate geodetic distance calculating unit may determine, for each of the subclasses, as the inter-subclass distance between the subclass and the other one of the subclasses, an average of distances equal to or less than a predetermined threshold, from among distances between the each of the trajectories belonging to the subclass and the one of the trajectories belonging to the other one of the subclasses. This configuration allows calculating the inter-subclass approximate geodetic distance which is less subject to an influence of noise.

In addition, according to a more preferable embodiment regarding the method of generating subclasses, the subclass classification unit classifies the trajectories into the subclasses by classifying similar trajectories into a same subclass, from among the calculated trajectories. More preferably, the subclass classification unit classifies the trajectories into the subclasses by repeatedly performing, predetermined times or until the trajectories are classified into a predetermined number of subclasses, processing for classifying, into a same subclass, trajectories having highest similarity from among the calculated trajectories. By thus classifying trajectories having similarity into the same subclass, it is possible to reduce the amount of calculation for calculating the inter-subclass approximate geodetic distance as compared to the amount of calculation in the case of not classifying the trajectories into subclasses.

Furthermore, for the method of generating subclasses, according to another preferable embodiment, the subclass classification unit classifies the trajectories into the subclasses by segmenting, into a plurality of regions, at least one of the pictures received by the image input unit, using at least one of edge information, color information, and brightness information of the at least one of the pictures, and classifying, into a same subclass, trajectories passing through each of the regions resulting from the segmentation, and it is also possible to classify the trajectories into subclasses, using spatial information such as edge, brightness, and color.

Preferably, the moving object detection apparatus described above further includes an output unit which performs image processing on at least one of the pictures received by the image input unit such that each of the regions specified by the segmentation performed by the segmentation unit is displayed in a mode different from a mode in which another one of the specified regions is displayed, and outputs a picture including the region on which the image processing has been performed.

With this configuration, it is possible to produce an advantageous effect of allowing a user to recognize each imaging object more easily, by displaying the extracted moving object on the image in an audio-visual apparatus, an image monitoring apparatus, or the like.

More preferably, the moving object detection apparatus described above further includes a recording and transmission unit which writes onto a recording medium or transmits to an outside via a transmission path, at least one of the pictures that is assigned with a result of the segmentation performed by the segmentation unit, the pictures being received by the image input unit.

With this configuration, by separately storing each of the detected images of the moving object based on the extracted regions, and thereby selectively storing, and outputting to the outside, only an image of a necessary portion out of each image of the moving object, it is possible to efficiently store and output the images as pictorial elements. Thus, the configuration is effective in the case of storing and transmitting data to a device having a limited processing capacity such as a cellular phone.

In addition, the moving object detection apparatus described above may further include a prediction unit which calculates a representative trajectory that represents the class specified by the segmentation unit from among the trajectories included in the class, and predicts, according to the calculated representative trajectory, a motion of the moving object by predicting that a region corresponding to the class moves between pictures.

By predicting the motion of the moving object using the representative trajectory of a plurality of blocks, it is possible to perform motion prediction that is highly robust to noise.

A non-transitory computer-readable recording medium according to another embodiment of the present invention is a non-transitory computer-readable recording medium, on which data having a structure including header information and body information is recorded, and the header information includes: a size of pictures included in video; the number of the pictures included in the video; the number of trajectories obtained from the video; and the number of subclasses each of which is a set of similar trajectories, and the body information includes: as many pictures as indicated by the number of the pictures included in the video; data representing as many trajectories as indicated by the number of the trajectories obtained by the video; data representing the subclass to which each of the trajectories belongs; and an inter-subclass approximate geodetic distance representing, for each of the subclasses, similarity between the subclass and another one of the subclasses.

Thus, holding information on the picture size, the number of pictures, the number of trajectories, and the number of subclasses allows an apparatus which receives these data and performs segmentation to secure a sufficient memory for information necessary for segmentation. In addition, since the information necessary for the segmentation includes the inter-subclass approximate geodetic distance, it is possible to produce an advantageous effect of allowing the apparatus to perform segmentation with a smaller amount of memory.

A moving object detection data generating apparatus according to yet another embodiment of the present invention is a moving object detection data generating apparatus which includes: an image input unit which receives input of a plurality of pictures included in the video; a trajectory calculating unit which calculates a plurality of trajectories by detecting, for each block including at least one pixel that is included in one of the received pictures, a motion of the block between two pictures included in the video, and concatenating detected motions for the plurality of pictures; a subclass classification unit which classifies the calculated trajectories into a plurality of subclasses each of which is a set of similar trajectories; an inter-subclass approximate geodetic distance calculating unit which calculates, for each of the subclasses, an inter-subclass approximate geodetic distance which represents similarity between the subclass and another one of the subclasses, using an inter-subclass distance that is a distance including a minimum value of a linear distance between each of trajectories belonging to the subclass and one of trajectories belonging to the other one of the subclasses; and a data output unit which outputs data including at least the inter-subclass approximate geodetic distance calculated by the inter-subclass approximate geodetic distance calculating unit.

The data output unit outputs the data including the inter-subclass approximate geodetic distance. This allows another apparatus which has received the data to perform segmentation with a smaller amount of memory.

A moving object detection apparatus according to yet another embodiment of the present invention is a moving object detection apparatus which detects a moving object in video by performing segmentation on an image to specify all or part of regions of the moving object in the video, and the moving object detection apparatus includes: a data input unit which receives an input of data including at least an inter-subclass approximate geodetic distance representing similarity between each of trajectories belonging to a subclass which is a set of similar trajectories in the video and one of trajectories belonging to another one of the subclasses that is different from the subclass and is a set of similar trajectories in the video; and a segmentation unit which performs segmentation by specifying, based on the inter-subclass approximate geodetic distance received by the data input unit, a set of subclasses including similar trajectories as one class.

The input of the data including the inter-subclass approximate geodetic distance is received, and segmentation is performed. This allows performing segmentation with a smaller amount of memory as compared to the case of the segmentation based on the geodetic distance between trajectories.

Hereinafter, embodiments of the present invention will be described in detail with reference to the drawings.

(First Embodiment)

The following will describe a first embodiment of the present invention with reference to the drawings.

FIG. 1 is a diagram showing a configuration of a moving object detection apparatus 100 according to an embodiment of the present invention. As shown in FIG. 1, the moving object detection apparatus 100 includes: an image input unit 101, a trajectory calculating unit 102, a subclass classification unit 103, an inter-subclass approximate geodetic distance calculating unit 104, a segmentation unit 105, and an output unit 106. The moving object detection apparatus 100 is an apparatus which detects a moving object in video by performing segmentation to specify all or part of regions of the moving object in the video. In other words, the moving object detection apparatus 100 detects the moving object in the video by performing classification (clustering) to specify all or part of the regions of the moving object in the video, using trajectories made up of corresponding points between at least two pictures. Hereinafter, the picture is also referred to as the image.

The image input unit 101 is a processing unit which receives input of temporally different pictures included in the video, and is, for example, a camcorder or a communication interface or the like connected to the camcorder. In addition, the image input unit 101 may obtain such video from a memory in which the video is stored.

The trajectory calculating unit 102 is a processing unit which calculates trajectories by detecting a motion of an image between two pictures included in the video, for each of the blocks including at least one pixel and included in each of the pictures received by the image input unit 101, and concatenating the detected motions over more than one picture. Here, the block is a unit of calculating trajectories, and is a group of at least one pixel.

The subclass classification unit 103 is a processing unit which classifies the trajectories calculated by the trajectory calculating unit 102 into subclasses each of which is a set of similar trajectories. In other words, the subclass classification unit 103 classifies the trajectories calculated by the trajectory calculating unit 102 such that similar trajectories belong to the same subclass, and assigns, to each of the trajectories, a subclass label that is a result of the classification.

The inter-subclass approximate geodetic distance calculating unit 104 is a processing unit which calculates a distance which represents similarity between subclasses, using the trajectories labeled by the subclass classification unit 103. In the present embodiment, the subclass classification unit 103 calculates, using the intra-subclass distance and the inter-subclass distance, the inter-subclass approximate geodetic distance that is an approximate geodetic distance between subclasses, so as to capture the change in shape of the moving object as well as reducing the amount of time for calculating the distance. In other words, the inter-subclass approximate geodetic distance calculating unit 104 calculates, for each subclass, the inter-subclass approximate geodetic distance that represents similarity between the subclass and another subclass, using the inter-subclass distance including a minimum value of the linear distance between each of trajectories belonging to the subclass and one of trajectories belonging to the other subclass. Here, the geodetic distance is a distance of a path from a trajectory to another trajectory via yet another trajectory as a via-point. In addition, the intra-subclass distance is a distance that is calculated using trajectories labeled with the same subclass and represents similarity between the trajectories belonging to the same subclass. The inter-subclass distance is a distance including a minimum value of the linear distance between trajectories belonging to two different subclasses. Note that, to further reduce the amount of distance calculation, the inter-subclass distance may be used as the inter-subclass approximate geodetic distance, instead of using the intra-subclass distance. Note that the distance represents similarity, and, for example, a larger distance represents lower similarity, and a smaller distance represents higher similarity.

Here, when using S subclasses, the inter-subclass approximate geodetic distance to be calculated is represented by a distance matrix of S rows and S columns (S×S). Thus, by calculating the distance for evaluating similarity between the trajectories belonging to the two different subclasses, it is possible to represent, as an approximate geodetic distance matrix, the motion of a moving object whose linear distance between blocks varies, particularly, the motion of an object, like an articulated object, which moves changing shape such as a person. This allows robust extraction of the imaging object in response to the motion of the articulated object. Here, the "distance" as referred to in the present specification includes not only a distance between two points on a two-dimensional space but also an arithmetic distance between multi-dimensional data as described later, and is represented as a value or a set of values (distance matrix).

The segmentation unit 105 is a processing unit which performs segmentation by specifying a set of subclasses including similar trajectories as one class, based on the inter-subclass approximate geodetic distance calculated by the inter-subclass approximate geodetic distance calculating unit 104. In other words, the segmentation unit 105 determines whether or not to synthesize the set of subclasses including similar trajectories, based on the inter-subclass approximate geodetic distance calculated by the inter-subclass approximate geodetic distance calculating unit 104. Then, by classifying the subclasses into classes, the moving object in the video is detected. Here, since one class corresponds to a whole or part of an imaging object, it is possible to specify a region of the moving object once classifying the moving object into classes is made possible, thus allowing detecting the moving object. Note that the class is a set of subclasses.

The output unit 106 outputs the result of the moving object detection performed by the segmentation unit 105. Specifically, the output unit 106 performs image processing on at least one of the plurality of pictures received by the image input unit 101 such that, for example, the picture is displayed in a mode different from region to region of the moving object detected by the segmentation unit 105, and outputs a picture including the image-processed region to a display apparatus and so on.

Note that the "region" as referred to in the present specification includes both terms of a detection technique of extracting an image region in which a particular target object is present, and of a classification technique of classifying image regions (trajectories) for each object irrespective of the target. Note that the detection technique and the classification technique have much in common, and therefore are not distinguished from each other in the specification of the present invention.

Figure 2:
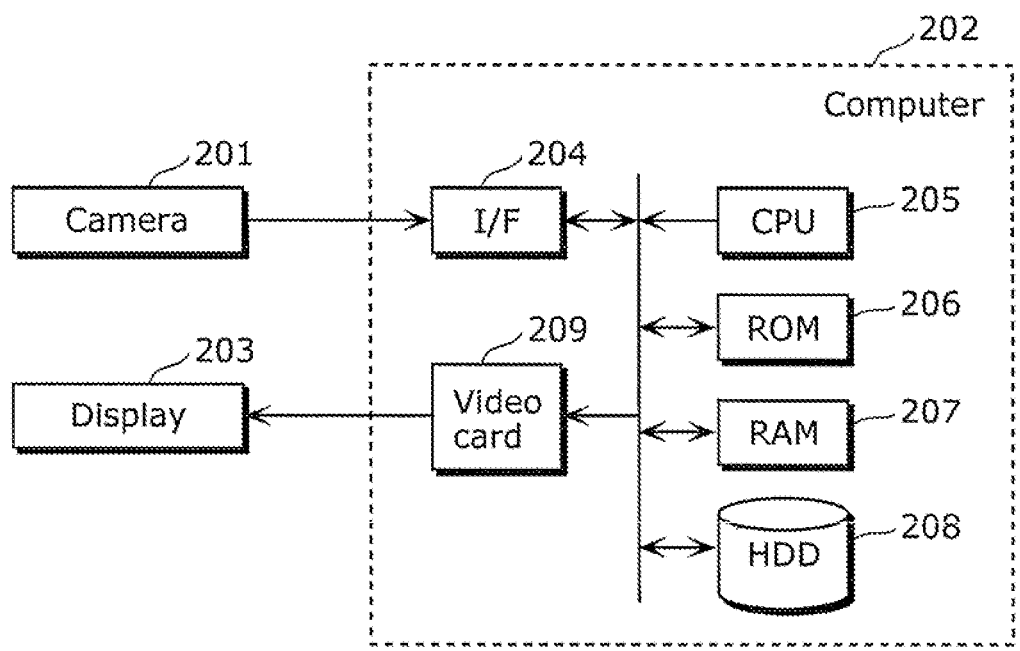
FIG. 2 is a hardware configuration diagram of the moving object detection apparatus according to the first embodiment of the present invention, when realized using software.

Note that each of the constituent elements described above (the image input unit 101, the trajectory calculating unit 102, the subclass classification unit 103, the inter-subclass approximate geodetic distance calculating unit 104, the segmentation unit 105, and the output unit 106) included in the moving object detection apparatus 100 may be realized as software to be executed on the computer such as a program or may be realized as hardware such as an electronic circuit or an integrated circuit. FIG. 2 is a diagram showing a hardware configuration of the moving object detection apparatus according to the present embodiment when realized using software. In FIG. 2, a camera 201 captures and outputs an image. A computer 202 obtains the image from the camera 201, performs moving object detection processing on the image, and then generates an image for displaying the result of the moving object detection. A display 203 obtains and displays the image generated by the computer 202. The computer 202 includes, an I/F 204, a CPU 205, a ROM 206, a RAM 207, an HDD 208, and a video card 209. A program causing the computer 202 to operate is previously held by the ROM 206 or the HDD 208. The program is read out from the ROM 206 or HDD 208 to the RAM 207 by the CPU 205 that is a processor, to be expanded. The CPU 205 executes each coded instruction in the program expanded by the RAM 207. The I/F 204 retrieves the image captured by the camera 201 into the RAM 207, according to the execution of the program. The video card 209 outputs the generated image according to execution of the program, and the display 203 displays the image.

Note that the computer program may be stored on, for example, an optical disc, without being limited to the ROM 206 or HDD 208 that is a semiconductor. In addition, the computer program may also be transmitted via a wired or wireless network, broadcasting, and so on, and may be retrieved into the RAM 207 in the computer.

Hereinafter, an operation of the moving object detection apparatus 100 according to the present embodiment will be described with reference to FIG. 3.

Figure 3:
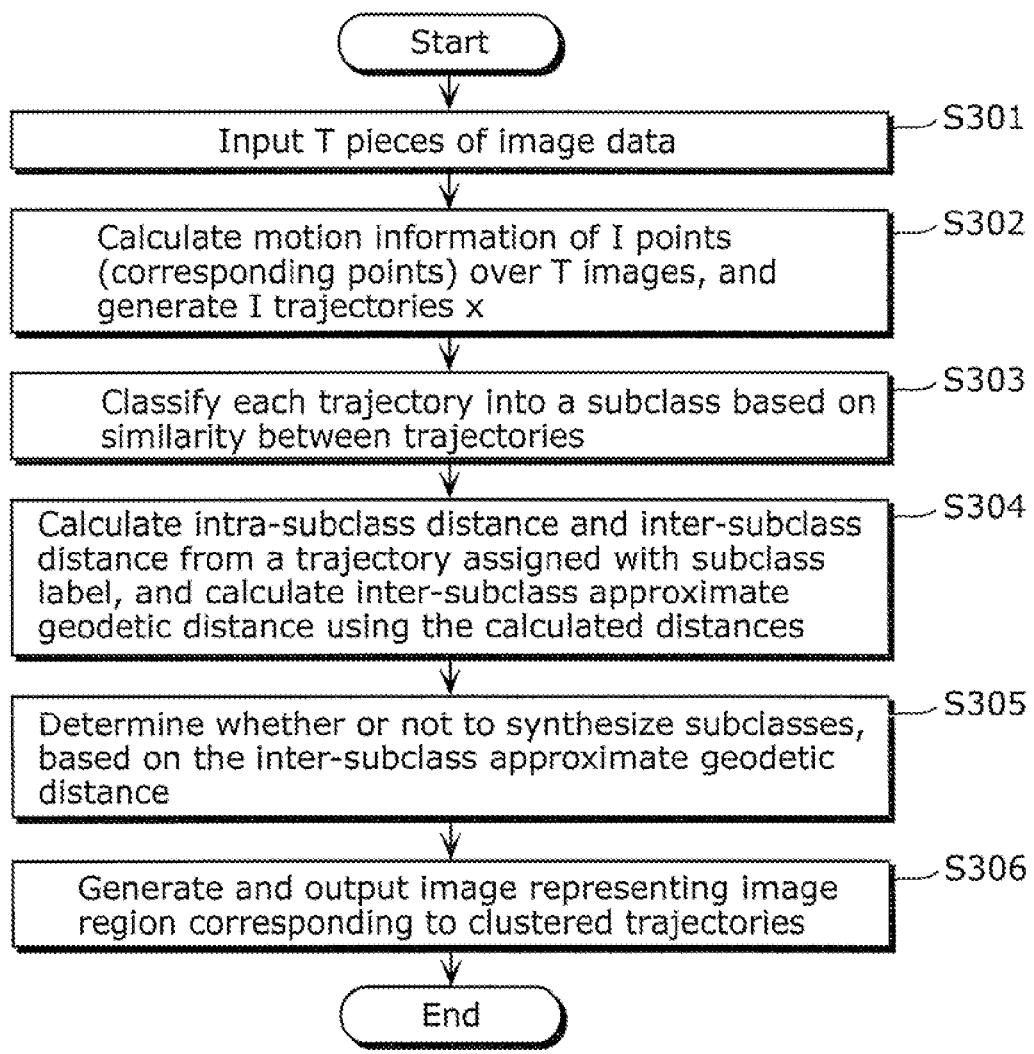
FIG. 3 is a flowchart showing a basic operation of the moving object detection apparatus according to the first embodiment of the present invention.

FIG. 3 is a flowchart showing the operation of the moving object detection apparatus 100 according to the present embodiment.

In FIG. 3, seven steps S301 to S306 correspond to the respective processing units in FIG. 1. In other words, the image input unit 101 performs an operation of an image input step S301; the trajectory calculating unit 102 performs an operation of a trajectory calculating step S302; the subclass classification unit 103 performs an operation of a subclass classification step S303; the inter-subclass approximate geodetic distance calculating unit 104 performs an operation of an inter-subclass approximate geodetic distance calculating step S304; the segmentation unit 105 performs an operation of a segmentation step S305; and the output unit 106 performs an operation of an image output step S306.

In the image input step S301, the image input unit 101 obtains, from the camera 201, a plurality of pictures included in the video. Here, it is assumed that T pictures are input.

Next, in the trajectory calculating step S302, the trajectory calculating unit 102 calculates motion information between the input pictures, and generates and outputs trajectories. As a technique of calculating the motion information between the plurality of (T) pictures here, based on a pixel at I points on a certain picture among the pictures as a reference pixel, a pixel corresponding to another T−1 picture is searched for in the picture. Note that, instead of the pixel at the I points, a corresponding small rectangular region may be searched for with reference to I small rectangular regions (blocks). For example, as shown in FIG. 4(a), by using pictures captured at time t and time t+1, the trajectory calculating unit 102 estimates pixel coordinates $(x_{it+1}, y_{it+1})$ on a picture at time t+1 which correspond to pixel coordinates $(x_{it+1}, y_{it+1})(i=1 \ldots I)$ of the pixel i on the picture at time t. In this processing, the trajectory calculating unit 102 scans (as indicated by dashed lines), on the picture at time t+1, a small rectangular region 404 (block) at time t, and estimates, as the corresponding pixel coordinates pixel coordinates (indicated by solid arrows) at a point when a summation of differences between pixel values in the small rectangular region at time t and pixel values in the small rectangular regions at time t+1 is smallest. For the pixel coordinates, pixel coordinates indicating a center position of the block may be used. Here, a scanning range of the small rectangular region 404 may be previously determined. In addition, a scale for evaluating a difference between blocks is not limited to the summation of differences of pixel values, but another scale may be used as long as the scale represents the difference between pixels included in the blocks to be compared. For example, a mean square error between the pixel value in the small rectangular region at time t and the pixel value in the small rectangular region at time t+1 may be used, or a value which is less subject to the influence of an outlier such as a median or the like may be used. In the case of three or more pictures, as shown in FIG. 4(b), the trajectory calculating unit 102 calculates I corresponding points for the input T pictures, by sequentially calculating corresponding coordinates between two adjacent pictures. Note that the two pictures used for calculating the corresponding coordinates need not necessarily be adjacent to each other. For example, another one or more pictures may be included between the two pictures.

As another specific technique for calculating the corresponding points between the plurality of pictures as described above, a method disclosed in Non-Patent Reference 4 or 5 may be used.

Non-Patent Reference 4: P. Anandan, "A Computational Framework and an Algorithm for the Measurement of Visual Motion", International Journal of Computer Vision, Vol. 2, pp. 283-310, 1989).

Non-Patent Reference 5: Vladimir Kolmogorov and Ramin Zabih, "Computing Visual Correspondence with Occlusions via Graph Cuts", International Conference on Computer Vision, 2001

Then, in the trajectory calculating step S302, the trajectory calculating unit 102 generates I trajectories corresponding to the respective pixels, from the set of pixel coordinates of the corresponding points that is motion information of the pixel at the I points over the T pictures. A trajectory xi of the pixel i is represented as in Expression 1 below, using a coordinate value $(x_1^i, y_1^i)$ of the pixel i on a picture of the first frame and pixel coordinates $(x_t^i, y_t^i)$ of the corresponding point:

[Math. 1]

$$x^i = (x_1^i, y_1^i, \ldots, x_t^i, y_t^i, \ldots, x_T^i, y_T^i) \quad \text{(Expression 1)}$$

Here, T is the number of pictures used for calculating the trajectories.

FIG. 4(b) is a diagram showing an example of the trajectory $x^i$. The trajectory $x^i$ is a vector that is made up of sets of pixel coordinates and calculated, in T input images 401 from time t to time t+(T−1), from motion information 402 from the pixel i 403 on a picture of the first frame to a pixel corresponding to the pixel i 403 on another picture.

Next, in the subclass classification step S303, the subclass classification unit 103 classifies I trajectories represented in Expression 1, into S subclasses. The classification into subclasses is described with reference to FIG. 5. For example, as shown in FIG. 5(a), it is assumed that imaging objects 501A and 501B included in the picture of the first frame move to the positions of imaging objects 502A and 502B in the Nth frame, respectively. In this context, the trajectories of the imaging objects 501A and 501B are represented by a plurality of trajectories 503A and 503B, respectively. However, to simplify the description, FIG. 5(a) shows only part of the trajectories.

Since the classification into subclasses only requires classifying similar trajectories into the same subclass, it is possible to use various methods. For example, by setting the number of subclasses to S, with input of I trajectories as shown in Expression 1, and using the k-means method as shown in Non-Patent Reference 6, pp. 526-528, it is possible to classify trajectory vectors into subclasses on a multi-dimensional space made up of the trajectory vectors as shown in FIG. 5(b). Here, each circle in FIG. 5(b) indicates a point on the multi-dimensional space, which corresponds to each of the trajectories as shown by dashed arrows in FIG. 5(a). Although the points corresponding to the trajectories are represented on a three-dimensional space diagram for the sake of description, the space in which the trajectory vectors exist is actually a multi-dimensional space of 2×T dimensions as represented in Expression 1. Thus, as shown in FIG. 5(c), on the multi-dimensional space, it is possible to classify I trajectories into S subclasses, assuming that similar trajectories belong to the same subclass.

Furthermore, with input of I trajectories, it is possible to use a clustering algorithm based on a dendrogram as shown in Non-Patent Reference 6, pp. 550-555. Here, processing of sequentially determining trajectory pairs having highest similarity (having a shortest distance) as the same subclass is repeatedly performed either predetermined times or until the number of subclasses becomes S. As a result, as shown in FIG. 5(c), it is possible to classify I trajectories into S subclasses, assuming that similar trajectories belong to the same subclass. Note that here, to represent the similarity between trajectories, a Euclidian distance between trajectory vectors may be used, or a distance obtained by normalizing the Euclidian distance using the number of trajectories belonging to the same subclass may be used.

For example, when calculating the similarity (distance) between trajectory pairs, as shown in FIG. 5(d), the size of each subclass is likely to be uniform when normalization is performed using the number of trajectories belonging to the same subclass. In other words, this reduces variation in the number of trajectories belonging to each subclass. Note that the distance or the similarity is not limited to the distance or similarity calculated by the calculation method described above, and may be any distance or similarity as long as it allows determination of similarity between trajectory vectors. Note that in these cases, a smaller distance represents higher similarity. In other words, performed here is processing for classifying, into the same subclass, pairs of trajectories either having highest similarity or having a smallest distance. Thus, the result of classifying the trajectories into subclasses is shown in FIG. 5(d). More specifically, as a result of assigning a subclass label to each trajectory, similar trajectories are classified into the same subclass. For example, when the target is a person, it is possible to obtain a result which represents a body of the person segmented into smaller portions as shown in FIG. 5(d).

Non-Patent Reference 6: Richard O. Duda, Peter E. Hart and David G Stork, "Pattern Classification", John Wiley & Sons, Inc., 2001

By the processing using the clustering algorithm as described above, each trajectory $x^i$ belongs to one of subclasses Dj as shown in Expression 2 below. In other words, each trajectory is assigned with a subclass Dj label.

[Math. 2]

$$x^{i \in D_j} = (x_1^i, y_1^i, \ldots, x_t^i, y_t^i, \ldots, x_T^i, y_T^i) \quad \text{(Expression 2)}$$

Note that the classification into subclasses may be performed such that a size of the region corresponding to the subclasses is equal to or smaller than a minimum size of the moving object intended to be detected, or may be performed such that the number of subclasses may be larger than the number of imaging objects that is previously assumed.

Figure 6:
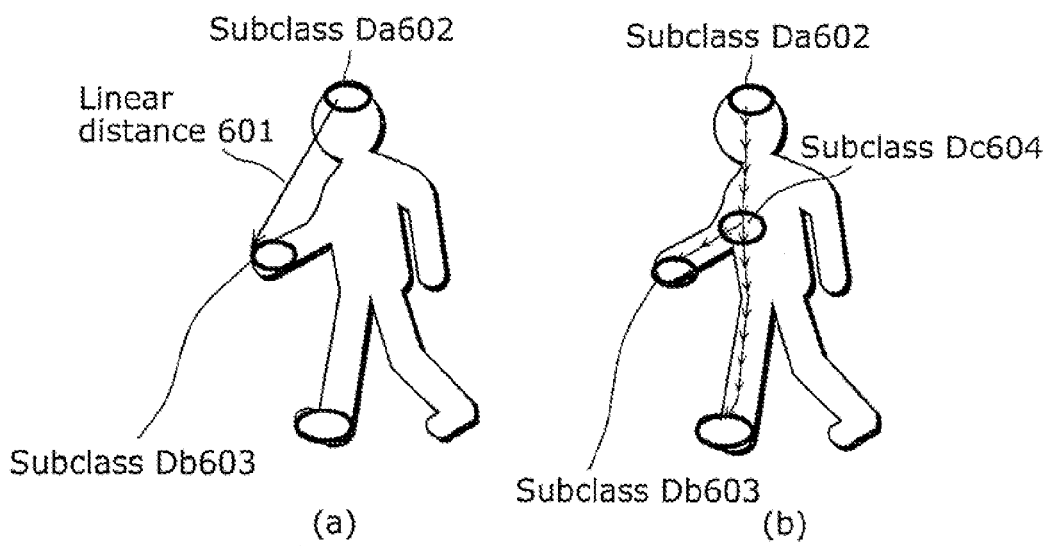
FIG. 6 is a diagram showing an example of an advantageous effect of a geodetic distance according to the first embodiment of the present invention.

Next, in the inter-subclass approximate geodetic distance calculating step S304, the inter-subclass approximate geodetic distance calculating unit 104 calculates an inter-subclass approximate geodetic distance, using the subclass label assigned in the subclass classification step S303 and the trajectories belonging to the subclass. Here, an advantage of calculating the geodetic distance is described with reference to FIG. 6. Here, to describe the difference between the linear distance and the geodetic distance in a more understandable manner, an inter-trajectory distance at time t is given as an example. For example, a linear distance 601 between a pixel in a head region belonging to a subclass Da602 and a pixel in a hand region belonging to a subclass Db603 is a distance shown in FIG. 6(a). On the other hand, in the case of the geodetic distance, as shown in FIG. 6(b), a geodetic distance between the pixel in the head region belonging to the subclass Da602 and the pixel in the hand region belonging to the subclass Db603 is a sum of distances to be traveled, as shown by arrows, until reaching the pixel in the hand region belonging to the subclass Db603 through a via-point that is a pixel belonging to the subclass Dc604. Thus, whereas the linear distance 601 as shown in FIG. 6(a) cannot continuously represent a shape continuously connected by joints, such as a person, the geodetic distance as shown in FIG. 6(b) produces an advantageous effect of allowing representing, as a distance, continuity of a shape that is continuously connected by joints.

Note that for calculating the geodetic distance, it is necessary to perform calculating for searching out a shortest path between two points that passes through a via-point as shown in FIG. 6(b), instead of calculating, as shown in FIG. 6(a), the linear distance between the pixel in the head region belonging to the subclass Da602 and the pixel in the hand region belonging to the subclass Db603. For an efficient calculation method for searching out the shortest path, for example, the Dijkstra method as shown in Non-Patent Reference 7 is widely known, but Non-Patent Reference 3 reports that even use of this method would result in a vast amount of calculation when, in particular, counting a large number of trajectories.

Non-Patent Reference 7: E. W. Dijkstra, "A note on two problems in connexion with graphs", Numerische Mathematik, pp. 269-271, 1959

Figure 7:
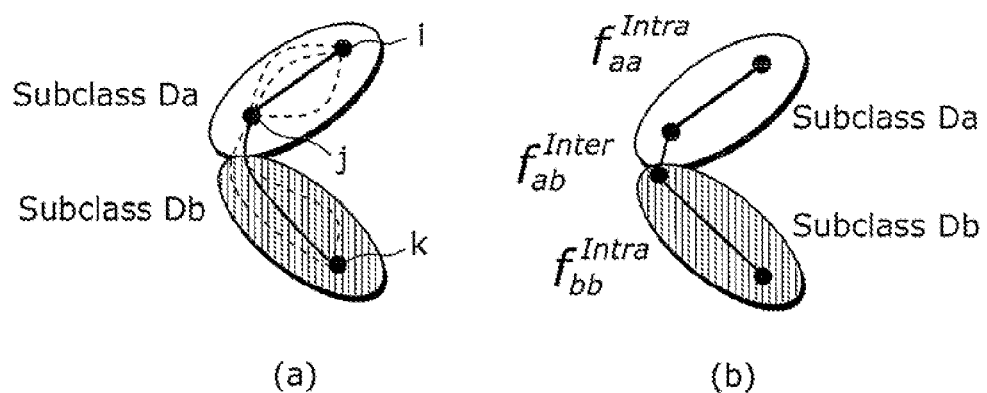
FIG. 7 is a diagram showing an example of an advantageous effect of an inter-subclass approximate geodetic distance according to the first embodiment of the present invention.

Thus, in the inter-subclass approximate geodetic distance calculating step S304, in order to realize calculating the distance having the same characteristics as the geodetic distance with a smaller amount of calculation, the inter-subclass approximate geodetic distance calculating unit 104 calculates the inter-subclass approximate geodetic distance. Here, a method of approximating the inter-subclass geodetic distance will be described. For example, as shown in FIG. 7(a), for calculating the geodetic distance between the trajectory of the pixel i and the trajectory of a pixel j, even if the Dijkstra method shown in Non-Patent Reference 7 is used, it is necessary to calculate a plurality of candidate distances connecting trajectories of the pixel i and trajectories of the pixel j (shown by solid and dashed lines), and to select the minimum distance (solid line) from among the candidate distances. This requires a large amount of calculation during the process of calculating candidate distances.

However, since similar trajectories are classified into the same subclass in the subclass classification step S303, it is possible to assume that the trajectories classified into the same subclass are similar. In other words, as shown in an example in FIG. 5, in which trajectories are classified into subclasses, the trajectories belonging to the same subclass can be considered as trajectories of a rigid body whose shape does not change significantly. Then, in the case of the trajectories of the rigid body, it is possible to consider that the difference between the geodetic distance and the linear distance is small. Accordingly, for the trajectories within the subclass, assuming that the difference between the linear distance and the geodetic distance is small, an average geodetic distance is approximated by an average linear distance as shown in FIG. 7(b). That is, the relationship between the average linear distance within the subclass

[Math. 3]

$$\overline{f_{aa}^{Intra}}$$

and the average geodetic distance within the subclass

[Math. 4]

$$\overline{g_{aa}^{Intra}}$$

can be represented in Expression 3 as below:

[Math. 5]

$$\overline{f_{aa}^{Intra}} \approx \overline{g_{aa}^{Intra}} \quad \text{(Expression 3)}$$

Next, the inter-subclass distance that is the distance between trajectories belonging to different subclasses is described. An example of calculating the inter-subclass distance using the method disclosed in Non-Patent Reference 7 is given. For example, for calculating, in FIG. 7(a), the geodetic distance between the trajectory of the pixel j belonging to the subclass Da and the trajectory of a pixel k belonging to the subclass Db, it is necessary to calculate a plurality of candidate distances connecting the respective trajectories of the pixel j and the respective trajectories of the pixel k (shown by solid and dashed lines), and to select the minimum distance (solid line) from among the candidate distances. However, as described earlier, the trajectories within the subclass can be approximated by the linear distance. Thus, a distance connecting one subclass and the other subclass is important. Here, as shown in FIG. 7(b), the minimum distance connecting one subclass and another subclass is defined as the inter-subclass distance. According to this method, it is not necessary to perform processing, as shown in FIG. 7(a), for searching out the shortest path for passing two points through a via-point, and it is only necessary to calculate a minimum value of a linear distance $f_{min}^{Inter}$ between the trajectories belonging to the subclasses Da and the trajectories belonging to Db. Furthermore, to be more robust against noise, a plurality of distances may be selected from among distances between the trajectories belonging to the subclass Da and the trajectories belonging to the subclass Db in ascending order, and an average of the selected distances may be determined to be $f_{min}^{Inter}$ or a median of the selected distance may be determined to be $f_{min}^{Inter}$.

Then, as shown in FIG. 7(b), the inter-subclass approximate geodetic distance g' can be represented as Expression 4 below.

[Math. 6]

$$\overline{g_{ab}^{Inter}} \approx g' _{ab} = \overline{f_{aa}^{Intra}} + f_{min}^{Inter} + \overline{f_{bb}^{Intra}} \qquad \text{(Expression 4)}$$

The inter-subclass approximate geodetic distance g' is not necessarily limited to Expression 4 above, and $f_{min}^{Inter}$ may be determined, for example, to be the inter-subclass approximate geodetic distance g'.

As shown in FIG. 7(c), by using the distance within the subclass and the distance between subclasses, it is possible to calculate the inter-subclass approximate geodetic distance as described above.

The specific example of calculation is described in detail with reference to FIG. 8. In FIG. 8(a), each ellipse represents a subclass. In other words, each ellipse includes trajectories belonging to each subclass. In addition, as shown in FIG. 8(a), it is assumed that, on a multi-dimensional space, the subclasses Da and Db are adjacent to each other, and the subclasses Db and Dc are adjacent to each other. Thus, the inter-subclass approximate geodetic distance calculating unit 104 calculates the distance between trajectories according to Expression 5 below, using the trajectories belonging to the same subclass.

A distance $f_{aa}(i, j)$ between the trajectories of the pixel i and the pixel j which belong to the subclass Da can be calculated according to Expression 5 below.

[Math. 7]

$$f_{aa}(i, j) = \frac{1}{T}\sum_{t=1}^{T} d_{ij}^{t} \qquad \text{(Expression 5)}$$

Here, $$d_{ij}^{t} = \sqrt{(x_t^i - x_t^j)^2 + (y_t^i - y_t^j)^2} \; i, j \in D_a$$

Note that as an equation for calculating the distance $f_{aa}(i, j)$ between the trajectories of the pixel i and the pixel j which belong to the subclass Da, Expression 6 below may be used instead of Expression 5.

[Math. 8]

$$f_{aa}(i,j) = ptn_{ij} + w \cdot mtn_{ij} \; i, j \in D_a \qquad \text{(Expression 6)}$$

However, $$ptn_{ij} = \frac{1}{T}\sum_{t=1}^{T} d_{ij}^{t}$$

$$mtn_{ij} = \sqrt{\frac{1}{T}\sum_{t=1}^{T} (d_{ij}^{t} - ptn_{ij})^2}$$

$$d_{ij}^{t} = \sqrt{(x_t^i - x_t^j)^2 + (y_t^i - y_t^j)^2}$$

Here, w is a weighting factor and a parameter to be set by a designer. The distance $f_{aa}(i, j)$ between the trajectories of the pixel i and the pixel j which belong to the subclass Da is calculated by adding a temporal fluctuation term $mtn_{ij}$ of inter-trajectory distances to a temporal average $ptn_{ij}$ of inter-trajectory distances. Particularly, the temporal fluctuation term $mtn_{ij}$ of the inter-trajectory distance represents similarity in pixel motion, and with this, it is possible to capture not only a rigid body whose distance relationship between pixels does not change over time but also an articulated object or the like which changes shape. Thus, the distance calculation according to Expression 5 or Expression 6 is performed on each subclass. In the example shown in FIG. 8, for each of the subclasses from Da to Dc, the distance is calculated using the trajectories belonging to the same subclass. Note that the distance $f_{aa}(i, j)$ between the trajectories of the pixel i and the pixel j which belong to the same subclass is not necessarily limited to the distance as described above, and, for example, an inner product of trajectory vectors or cosine (COS) may be used, and any scale may be used as long as the scale represents similarity in distance or motion on pixels between trajectories.

Next, according to Expression 7, an average of distances between trajectories $f_{aa}(i, j)$ for each subclass, that is, an intra-subclass distance is calculated.

[Math. 9]

$$\overline{f_{aa}^{Intra}} = \frac{1}{N}\sum_{i,j} f_{aa}(i, j) \; i, j \in D_a \qquad \text{(Expression 7)}$$

Here, N is the number of combinations of trajectories i and j. Note that a mode or median of the distance between trajectories $f_{aa}(i, j)$ may be used as the intra-subclass distance. The intra-subclass distance can be calculated from the distance $f_{aa}(i, j)$ between arbitrary trajectories from among trajectories included in the same subclass, and N need not necessarily be combinations of all the trajectories i and j. In addition, instead of Expression 7, $f_{aa}(i, j)$ may be calculated in plural combinations of trajectories i and j, and the maximum value thereof may be determined as the intra-subclass distance.

Next, the inter-subclass approximate geodetic distance calculating unit 104 calculates the inter-subclass distance according to Expression 8 below.

[Math. 10]

$$f_{min}^{Inter} = \min_{i \in Da, j \in Db} f_{ab}(i, j) \quad \text{(Expression 8)}$$

Expression 8 is for calculating the minimum distance among the distances of trajectories i and j belonging to different subclasses. Furthermore, the method of calculating the inter-subclass distance is not limited to this, and for example, N distances may be selected in ascending order from among distances of the trajectories i and j belonging to different subclasses, and an average of the N distances may be determined as the inter-subclass distance, or the average thus calculated may further be weighted. Furthermore, a median of the above N distances may be determined as the inter-subclass distance.

Here, when the inter-subclass distance $f_{min}^{Inter}$ that is calculated using Expression 8 is higher than a predetermined threshold, processing assuming the inter-subclass distance $f_{min}^{Inter}$ as infinite may be performed. For example, when calculating the inter-subclass distance $f_{min}^{Inter}$ by assuming the size of the input image to be 640×480 and segmenting the trajectories into 4×4 grids, and using only a trajectory passing over the grids at time t, it is possible to obtain a satisfactory result when the threshold is approximately 10.0. It is naturally preferable that the above parameter be adjusted according to the size of the image or spatial density of the trajectories (the larger the grid size, the smaller the density).

As described above, using the intra-subclass distance and the inter-subclass distance calculated according to Expressions 7 and 8, it is possible to calculate the inter-subclass approximate geodetic distance according to Expression 4.

Then, an intra-subclass distance and inter-subclass approximate geodetic distance matrix G' of S×S including, as constitutional elements, subclasses shown in Expression 9 below, is generated. Here, as shown in FIG. 8(b), a diagonal element of the intra-subclass distance and inter-subclass approximate geodetic distance matrix G' is an intra-subclass distance, and an element other than the diagonal element is an inter-subclass approximate geodetic distance.

[Math. 11]

$$G' = \{g'(s_i, s_j)\} \quad \text{(Expression 9)}$$

Here, $s_i$ and $s_j$ are subclass indices.

Next, as described earlier, when the inter-subclass distance $f_{min}^{Inter}$ is larger than the predetermined threshold, processing assuming $f_{min}^{Inter}$ as infinite may be performed, and the infinite inter-subclass approximate geodetic distance may be recalculated as below.

[Math. 12]

$$g'(a,c) = \min(g'(a,c), g'(a,b) + g'(b,c)) \quad \text{(Expression 10)}$$

Note that min(x, y) in Expression 10 above is a function which returns a smaller one of values x and y.

As shown in FIG. 8(a), when calculating the approximate geodetic distance between the subclasses Da and Dc, the subclass Db functions as a via-point for reaching the subclass Dc from the subclass Da. Here, the via-point is not limited to one point.

For searching out the shortest path between two points in calculating the geodetic distance as described earlier, it is possible to use, for example, the Dijkstra method disclosed in Non-Patent Reference 4. This allows searching out the shortest path without limiting the number of via-points to one point. The order of the amount of calculation in the Dijkstra method is represented by $N^2 \log N$ where N is the number of data points. Here, it is assumed that: N is the number of trajectories when performing the Dijkstra method without performing the processing in steps S303 and S304, and M is the number of subclasses when calculating the inter-subclass approximate geodetic distance. For example, when performing the processing such that 100 similar trajectories are classified into one subclass, even when using the Dijkstra method, this produces an advantageous effect of reducing, to 1/20000, the amount of calculation according to the Dijkstra method. Thus, in the Dijkstra method, the amount of calculation non-linearly increases as the number of trajectories increases. On the other hand, the amount of calculation required for assigning subclass labels in step S303 linearly increases with respect to the number of trajectories. Thus, when the image size is large, or when calculating the trajectories on a space with high density, this produces an advantageous effect of reducing the amount of calculation, particularly under the condition in which the number of trajectories increases.

Next, in the segmentation step S305, the segmentation unit 105 determines whether or not to synthesize sets of similar trajectories (subclasses), using the inter-subclass approximate geodetic distance. Here, any method may be used as long as the method allows determining whether or not to synthesize subclasses. For example, it is possible to use the method described in Non-Patent Reference 1. Dimensional reduction may be performed on the intra-subclass distance and inter-subclass distance approximate geodetic distance matrix G' represented by Expression 9, and then whether or not to synthesize subclasses may be determined using the clustering method such as the k-means method on the dimensionally-reduced space. It goes without saying that the clustering method is not limited to the k-means method. The specific processing will be described below.

First, the segmentation unit 105 performs dimensional reduction on the intra-subclass distance and inter-subclass distance approximate geodetic distance matrix G' calculated in step S304. The dimensional reduction can be realized by generating Eigensystem after performing Young-Householder transformation. This is the method for efficiently projecting the multi-dimensionally distributed data onto a low-dimensional space, and allows a robust data representation against noise in the input data (here, corresponding to the case where the motion information of the pixel i includes an error when calculating the temporal trajectory of the pixel i in Expression 2 above) or noise in the inter-subclass distance $f_{min}^{Inter}$ in Expression 4 above.

In other words, as shown in Expression 11 below, the Young-Householder transformation is performed by multiplying the intra-subclass distance and inter-subclass distance approximate geodetic distance matrix G' by a centering matrix H from both sides. The processing is performed for transforming the distance matrix made up of point-to-point distances into a distance matrix having a centroid as an origin.

[Math. 13]

$$\tau(G') = \frac{HG'^{(2)}H}{2} \quad \text{(Expression 11)}$$

However, H is a centering matrix, and
[Math. 14]

$$H_{ab} = (I - 1/N) \quad \text{(Expression 12)}$$

I is a unit matrix, and N is the number of subclasses.

In addition,
[Math. 15]

$$G'^{(2)} = \{g'(s_i, s_j)^2\} \quad \text{(Expression 13)}$$

Here, $s_i$ and $s_j$ are subclass induces.

Next, the segmentation unit 105 calculates, for performing dimensional reduction, P eigen vectors $e_p$ for T(G) and an eigen value $\lambda_p$ corresponding to each of the P eigen vectors $e_p$.

With this, when
[Math. 16]

$$g'^a = (g'(a,0), g'(a,1), \ldots, g'(a,S)), \quad \text{(Expression 14)}$$

the result of projecting $g'^a$ onto the dimensionally-reduced space can be represented as data $z_p{}^a$ as below.
[Math. 17]

$$z_p{}^a = \sqrt{\lambda_p} e_p{}^a \quad \text{(Expression 15)}$$

Note that $e_p{}^a$ is an a-th element of a p-th eigen vector $e_p$. The number P of eigen vectors may be experimentally determined according to the intended scene or may be determined based on a contribution ratio $\alpha_p$ calculated from the eigen value $\lambda_p$ as below.

[Math. 18]

$$\alpha_p = \frac{\sum_{p=1}^{P} \lambda_p}{\sum_{p=1}^{N} \lambda_p} \quad \text{(Expression 16)}$$

Here, P is the number of eigen vectors to be used, that is, the number of dimensions of the dimensionally-reduced space. N is the number of all the eigen vectors. Thus, the number P at the contribution ratio $\alpha_p$ equal to or above a predetermined value may be considered to be the number of the eigen vectors.

As described above, with the processing according to Expressions 2 to 16, it is possible to classify the temporal trajectories of the pixel i shown in Expression 2 into subclasses, and obtain the data $z_p{}^a$ on the dimensionally-reduced space spanned by eigen vectors $e_p$, using the subclasses resulting from the classification, and the intra-subclass and inter-subclass approximate geodetic distance matrix G' that are generated from the trajectories belonging to each subclass.

A specific example of the processing performed by the segmentation unit 105 is described with reference to FIG. 9.

Figure 9:
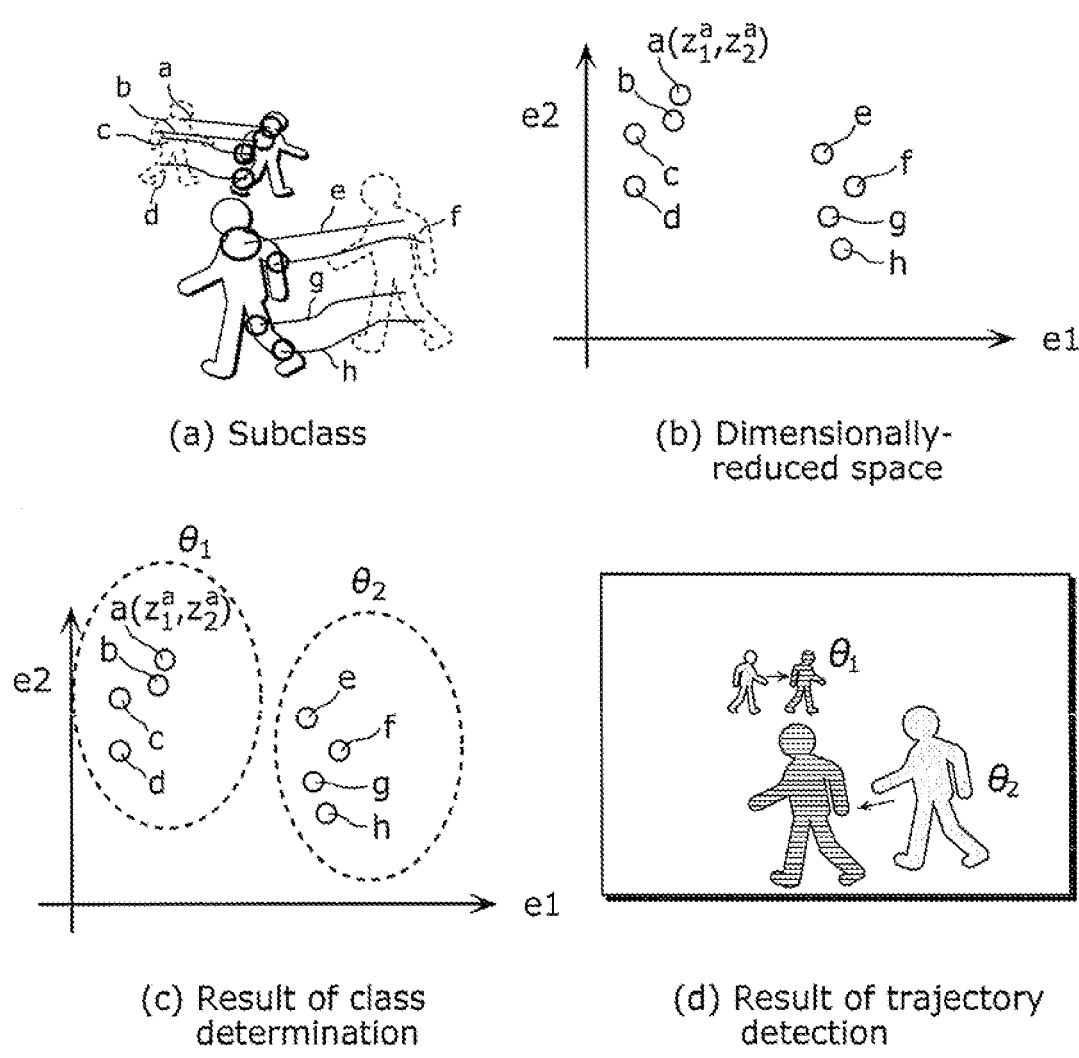
FIG. 9 is a diagram showing an example of processing performed by a segmentation unit according to the first embodiment of the present invention.

FIG. 9(*a*) shows trajectories a to h when an image of a walking person is input, and FIG. 9(*b*) is a result of projecting, onto the dimensionally-reduced space, a plurality of subclasses each of which includes similar trajectories as a result of classification. Horizontal and vertical axes represent eigen vectors $e_1$ and $e_2$, respectively. A point $(Z_1{}^a/Z_2{}^a)$ projected onto a two dimension is a projection of $g'^a$ shown in Expression 14. Here, since the data $z_p{}^a$ on the nonlinear space and the subclass Da have a one-on-one relationship, it is possible to relate a trajectory $x^i \epsilon^{Da}$ of or the pixel i on the image, which belongs to the subclass Da, to the data $z_p{}^a$ on a nonlinear space. Note that the nonlinear space need not necessarily be two-dimensional although the two-dimensional nonlinear space has been assumed here, and it is possible to project the data with higher accuracy on a higher-order dimension. For the number of dimensions, it is preferable to set the dimension higher than two dimensions but lower than the number of dimensions of the trajectory vectors shown in Expression 1.

Next, the segmentation unit 105 detects the moving object by determining whether or not to synthesize subclasses for the data projected onto the dimensionally-reduced nonlinear space.

First, a class is represented as below. Here, the number of classes corresponds to the number of moving objects.
[Math. 19]

$$\theta = \{\theta_1, \ldots \theta_m \ldots \theta_M\} \quad \text{(Expression 17)}$$

Here, M is the number of classes and empirically determined according to the intended scene.

Each class $\theta_m$ is represented by a parameter
[Math. 20]

$$\overline{Z_m}$$

and parameter $Z_m$. Here,
[Math. 21]

$$\overline{Z_m}$$

is an average of coordinate values of the projected data belonging to the class $\theta_m$ on the dimensionally-reduced nonlinear space, and $Z_m$ is a covariance matrix related to the coordinate values of the projected data belonging to the class $\theta_m$. An initial value of
[Math. 22]

$$\overline{Z_m}$$

may be determined at random, or the dimensionally-reduced nonlinear space may be divided at regular intervals by grids, or the is like, so as to determine a coordinate value at an intersection thereof to be the initial value.

Note that
[Math. 23]

$$\overline{Z_m}$$

and $Z_m$ can be represented as Expressions 18 and 19 below.

[Math. 24]

$$\overline{z_m} = \begin{bmatrix} \overline{z_1^m} \\ \vdots \\ \overline{z_P^m} \end{bmatrix} \quad \text{(Expression 18)}$$

[Math. 25]

$$Z_m = \frac{1}{C_m} \sum_{c_m=1}^{C_m} \begin{bmatrix} z_1^{c_m} - \overline{z_1^m} \\ \vdots \\ z_P^{c_m} - \overline{z_P^m} \end{bmatrix} [z_1^{c_m} - \overline{z_1^m} \ \ldots \ z_P^{c_m} - \overline{z_P^m}] \quad \text{(Expression 19)}$$

Here, $C_m$ is the number of data belonging to the class $\theta_m$ on the dimensionally-reduced nonlinear space.

The following will describe a specific method for the calculation. First, the class $\theta_m$ to which the data $z_a$ on the dimensionally-reduced nonlinear space belongs is calculated using a distance function in the equation below.
[Math. 26]

$$\psi_m(z_a) = \phi_m(z_a) + \ln|Z_m| - \ln p(\omega_m) \quad \text{(Expression 20)}$$

Here, $\psi_m(z_a)$ represents a distance between the data $z_i$ on the nonlinear space, which corresponds to the temporal trajectories of the pixel i, and each class $\theta_m$. Each data belongs to a class $\theta_m$ when the value of $\psi_m(z_a)$ is smallest. Note that $\phi_m(z_a)$ is Mahalanobis' distance and can be represented in Expression 21 below.

[Math. 27]

$$\phi_m(z_a)=(z_a-\overline{z_m})^t Z_m^{-1}(z_a-\overline{z_m}) \quad \text{(Expression 21)}$$

In addition, $\phi_m(z_a)$ may be used instead of $\psi_m(z_a)$.

Furthermore, $\rho(\omega_m)$ may be a constant value, or may be previously set based on a shape, an area ratio, or the like of a region of a human body. $\omega_m$ is a weighting factor for the class $\theta_m$.

Next, based on the result of the calculation using Expression 20, using the data $z_a$ belonging to the class $\theta_m$, the parameter

[Math. 28]

$$\overline{z_m}$$

and $Z_m$ of the class $\theta_m$ are updated as shown in Expressions 22 and 23 below.

[Math. 29]

$$\overline{z_m} = \frac{\sum_{c_m=1}^{C_m} \omega_{c_m} z_{c_m}}{\sum_{c_m=1}^{C_m} \omega_{c_m}} \quad \text{(Expression 22)}$$

[Math. 30]

$$Z_m = \frac{\sum_{c_{ink}=1}^{C_m} \omega_{c_m}^2 (z_{c_m} - \overline{z_m})(z_{c_m} - \overline{z_m})^t}{\sum_{c_m=1}^{C_m} \omega_{c_m}^2} \quad \text{(Expression 23)}$$

Here, $z_{c_m}$ is data belonging to the class $\theta_m$ on the dimensionally-reduced nonlinear space. In addition, $\omega=1$ may also be applied, or the value of $\omega$ may be adjusted depending on a degree of displacement from the average of the input data. Thus, the segmentation unit 105 can obtain the class $\theta_m$ to which each of the data on the nonlinear space belongs, by repeatedly performing the distance calculation and parameter updating as shown in Expressions 20 to 23 a predetermined number of times. Note that another clustering method such as the k-means method or competitive learning may be used instead of the above. Note that the dimensional reduction of the intra-subclass distance and inter-subclass approximate geodetic distance matrix G' is not essential processing, but clustering may be performed for segmentation, by performing spectral clustering based on the intra-subclass distance and inter-subclass approximate geodetic distance matrix G'. For example, for the spectral clustering, it is possible to use the technique disclosed in Non-Patent Reference 8.

Non-Patent Reference 8: Ark Azran and Zoubin Ghahramani, "Spectral Methods for Automatic Multiscale Data Clustering", Proc. IEEE Computer Society Conference on Computer Vision and Pattern Recognition 2006 (CVPR06)

Thus, as a result of class determination by clustering, as shown in FIG. 9(c), the trajectories belonging to the subclasses Da to Dd are synthesized into one class $\theta_1$, and the trajectories belonging to the subclasses De to Dh are synthesized into the other class $\theta_2$. Since each trajectory is assigned with a class label, it is possible to extract the imaging object as shown in FIG. 9(d), by collecting the trajectories according to each class label. Note that not only the region on one image but also the result of tracking a pixel over a plurality of temporally consecutive images corresponds to each class on the dimensionally-reduced nonlinear space. In other words, the segmentation unit 105 can detect the imaging object (a region of the imaging object) and segment the image including the imaging object, as a result of performing segmentation on the dimensionally-reduced nonlinear space and thereby temporally tracking the region of the imaging object moving in the image. In addition, since it is not necessary to set a person candidate region as pre-processing, no segmentation failure due to an error in detecting the person candidate region is caused.

As described above, according to the present embodiment, it is possible, by performing clustering on the nonlinear space, to reliably detect the imaging object at high speed from the image including a person or the like that moves changing shape, without requiring fitting of a vast amount of parameters.

In other words, by calculating the approximate geodetic distance, it is possible to efficiently represent, at high speed, the data that is continuously and nonlinearly distributed, compared to the case of calculating the geodetic distance without performing approximation. In addition, it is possible to correctly extract, while keeping the characteristics of the geodetic distance, a region from an image including a moving object that moves changing shape such as a person, without being influenced by the posture or size of the moving object.

In addition, it is also possible to correctly detect the moving object and extract a region of the moving object at high speed, from an image including a moving object that moves changing shape such as a person, without being influenced by the posture or size of the moving object. Furthermore, it is also possible to predict movement of the moving object, and so on, using the result of the detection and region extraction.

Thus, today, with video capturing apparatuses such as a digital camcorder becoming widely used, the present invention provides an extremely high practical value as technology applied to: focus control and image quality improvement processing in digital cameras; a driving safety support system for vehicles; or collision avoidance control to avoid collision against a person and alarming using a robot.

(Second Embodiment)

Next, a moving object detection apparatus according to a second embodiment of the present invention will be described.

Figure 10:
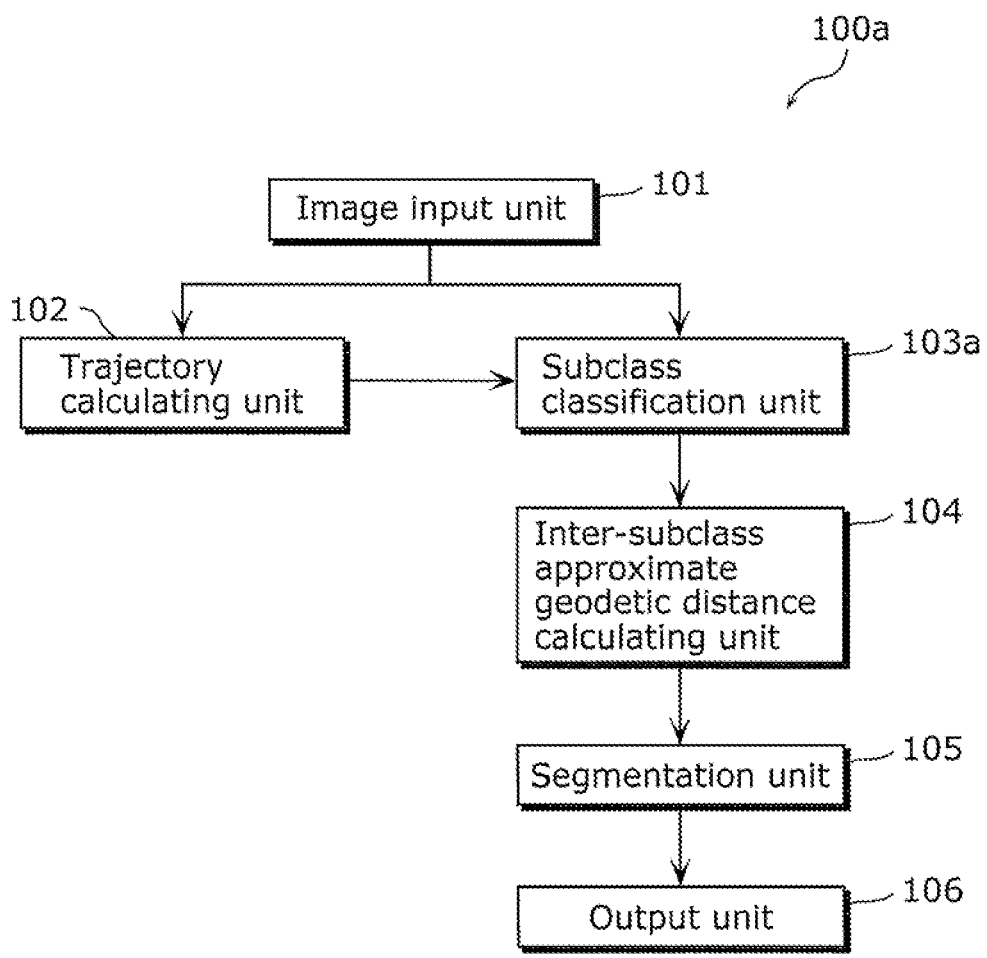
FIG. 10 is a diagram showing a basic configuration of a moving object detection apparatus according to a second embodiment of the present invention.
Figure 11:
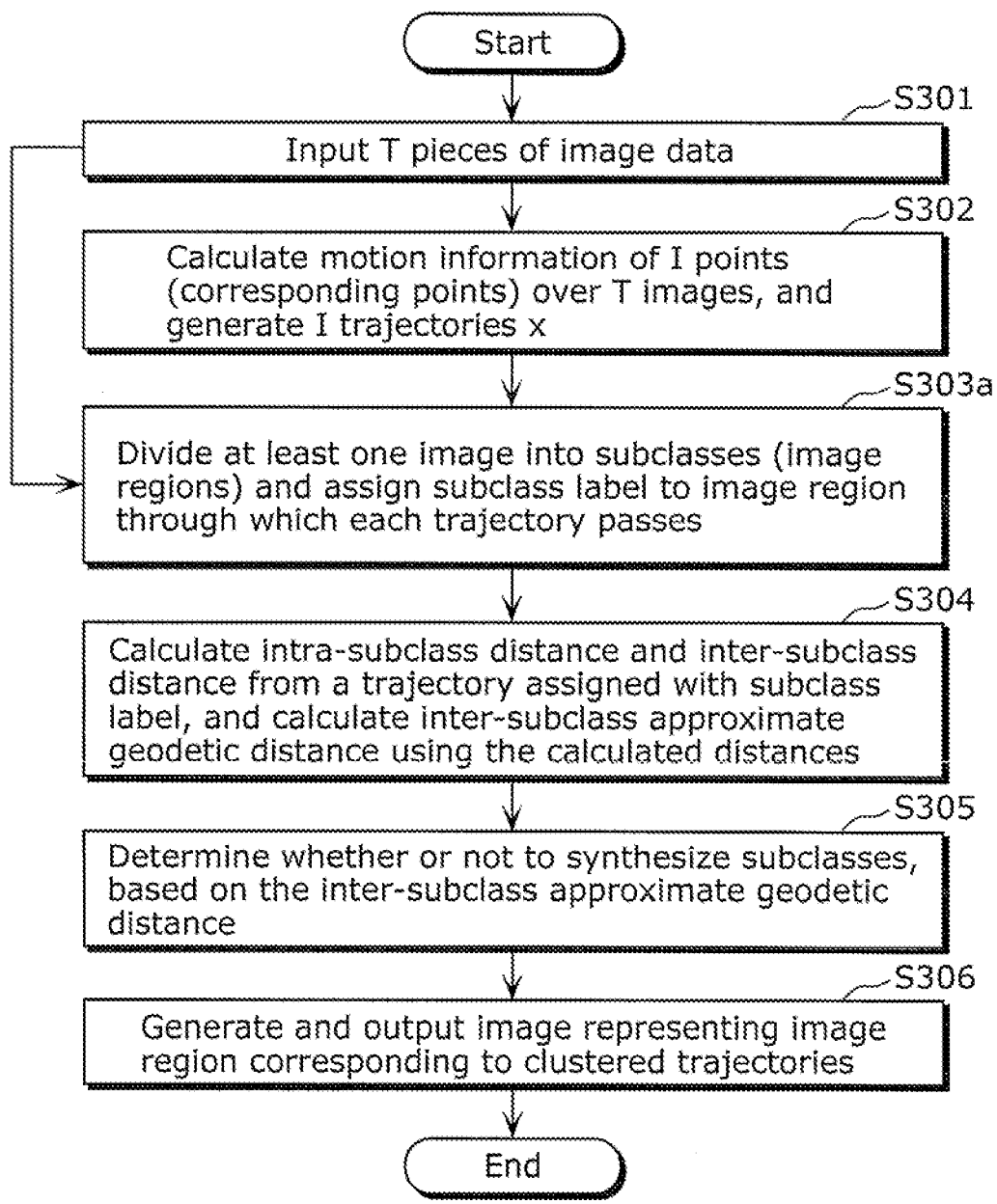
FIG. 11 is a flowchart showing a basic operation of the moving object detection apparatus according to the second embodiment of the present invention.

Here, an example is described in which the subclass classification processing is performed by the subclass classification unit 103 in a different manner from the manner described in the first embodiment. FIG. 10 is a diagram showing a configuration of a moving object detection apparatus 100a according to the second embodiment of the present invention.

The moving object detection apparatus 100a according to the second embodiment includes: an image input unit 101, a trajectory calculating unit 102, a subclass classification unit 103a, an inter-subclass approximate geodetic distance calculating unit 104, a segmentation unit 105, and an output unit 106.

Such a moving object detection apparatus 100a according to the second embodiment has the same configuration as the moving object detection apparatus 100 according the first embodiment, except for the configuration of the subclass classification unit 103a, and therefore the description of the same constituent elements will be omitted.

The subclass classification unit 103a performs processing for classifying similar image regions into the same subclass, from at least one of a plurality of images received by the image input unit 101, using brightness, edge information, color, and so on. Next, the subclass classification unit 103a assigns, to each trajectory calculated by the trajectory calculating unit 102, a subclass label of an image region through which the trajectory passes. In other words, the subclass classification unit 103a classifies trajectories passing through the same image region into the same subclass by assigning the same subclass label. The difference from the first embodiment is in performing the classification into subclasses not from trajectories but from information of the image, and assigning subclass labels to the trajectories based on the information. Note that the subclass classification processing performed on the image region by the subclass classification unit 103a can be performed without using the information regarding the trajectories. Thus, the subclass classification processing need not necessarily be performed after the processing by the trajectory calculating unit 102, and both processes may be performed in parallel, or the subclass classification processing on the image region may be performed before the processing by the trajectory calculating unit 102.

Hereinafter, an operation of the moving object detection apparatus 100a according to the first variation of the first embodiment of the present invention will be described with reference to the drawings.

Since steps S301 and S302 are the same as those in the first embodiment, the description thereof will be omitted. Next, in the subclass classification step S303a, the subclass classification unit 103a performs image segmentation using at least one of the images input in the image input step S301. Here, any method may be used as long as the method allows performance of segmentation using, as input, a pixel (brightness) value, color information, edge information or the like and position information thereof, and for example, the method disclosed in Non-Patent Reference 9 can be used.

Non Patent Literature 9: X. Ren and J. Malik, "Learning a Classification Model for Segmentation, International Conference on Computer Vision", Vol. 1, p. 10-17, 2003

According to the method disclosed in Non-Patent Reference 9, an image region is segmented into small regions using edge information or smoothness of a pixel value near the space. For example, when the target is a person, as shown in FIG. 12(a), the result shows a human figure finely segmented into portions. Here, when, for example, images of T frames are input, one image may be selected from among the input T images and segmented. Here, it is preferable to perform segmentation using a temporally intermediate image among the images, but this is not to limit the selection of the image.

Alternatively, for example, any method may be used as long as the method allows spatially segmenting the image: the pixel values and pixel positions may be arranged into a three-dimensional vector, and the image region may be segmented using a clustering algorithm such as the k-means method; color information such as RGB and pixel position information may naturally be arranged into a five-dimensional vector; and furthermore, a space differential vector (two-dimensional) of the pixel value and the pixel position may be arranged as edge information into a four-dimensional vector.

Then, based on the regions resulting from the segmentation as subclasses, a subclass label is assigned to each trajectory based on a relationship between the time of the image selected for the segmentation and the trajectory calculated in the trajectory calculating step S302.

Specifically, as shown in FIG. 12(b), the subclass classification unit 103a, assuming that each region resulting from the special segmentation as a subclass, assigns a subclass label according to which subclass each trajectory passes through on the image at time t' selected for the segmentation. For example, the trajectories from 1 to 4 pass through the respective subclasses Da to Dd at time t'. Thus, the subclass classification unit 103a assigns each of the subclass labels a to d to a corresponding one of the trajectories 1 to 4. By performing such processing to the corresponding trajectory, each trajectory x belongs to one of the subclasses Dj as shown in Expression 2. In other words, each trajectory is assigned with a subclass Dj label as with the processing in the subclass classification step S303 according to the first embodiment.

Since the processing in and after the inter-subclass approximate geodetic distance calculating step S304 is the same as the first embodiment, the description thereof will be omitted.

As described above, according to the second embodiment, it is possible to detect the imaging object in the image (a region of the imaging object) from the trajectories. In addition, it is not necessary to set the person candidate region as pre-processing. Thus, no failure due to an error in detecting the person candidate region is caused in segmentation. Furthermore, compared to the first embodiment, since it is possible to explicitly use information such as color or brightness, for example, it is possible to perform moving object detection with higher accuracy when detecting an imaging object dressed in a uniform color or the like. As described above, according to the second embodiment, it is possible, by performing clustering on the nonlinear space, to reliably detect the imaging object at high speed from the image including a person or the like that moves changing shape, without requiring fitting of a vast amount of parameters.

In other words, by calculating the approximate geodetic distance, it is possible to efficiently represent, at high speed, the data that is continuously and nonlinearly distributed, compared to the case of calculating the geodetic distance without performing approximation. In addition, it is also possible to correctly extract a region from an image including a moving object that moves changing shape such as a person, while keeping the characteristics of the geodetic distance which can efficiently represent the data that is continuously and nonlinearly distributed, without being influenced by the posture or size of the moving object.

In addition, it is also possible to correctly detect the moving object and extract a region of the moving object at high speed, from an image including a moving object that moves changing shape such as a person, without being influenced by the posture or size of the moving object. Furthermore, it is also possible to predict movement of the moving object and so on, using the result of the detection and region extraction.

Thus, today, with video capturing apparatuses such as a digital camcorder becoming widely used, the present invention provides an extremely high practical value as technology applied to: focus control and image quality improvement processing in digital cameras; a driving safety support system for vehicles; or collision avoidance control to avoid collision against a person and alarming using a robot.

(Third Embodiment)

Next, a moving object detection apparatus according to a third embodiment of the present invention will be described.

In the third embodiment, in addition to the first and second embodiments, whether or not to synthesize subclasses is determined based on temporal variation in the inter-subclass approximate geodetic distance.

Since the moving object detection apparatus 100 according to the third embodiment has the same configuration as the moving object detection apparatus 100 according to the first embodiment as shown in FIG. 1, the description of each constituent element will be omitted. However, the processing performed by the segmentation unit 105 is different from the processing in the first embodiment. The following will describe the third embodiment centering on the differences from the first embodiment.

Figure 13:
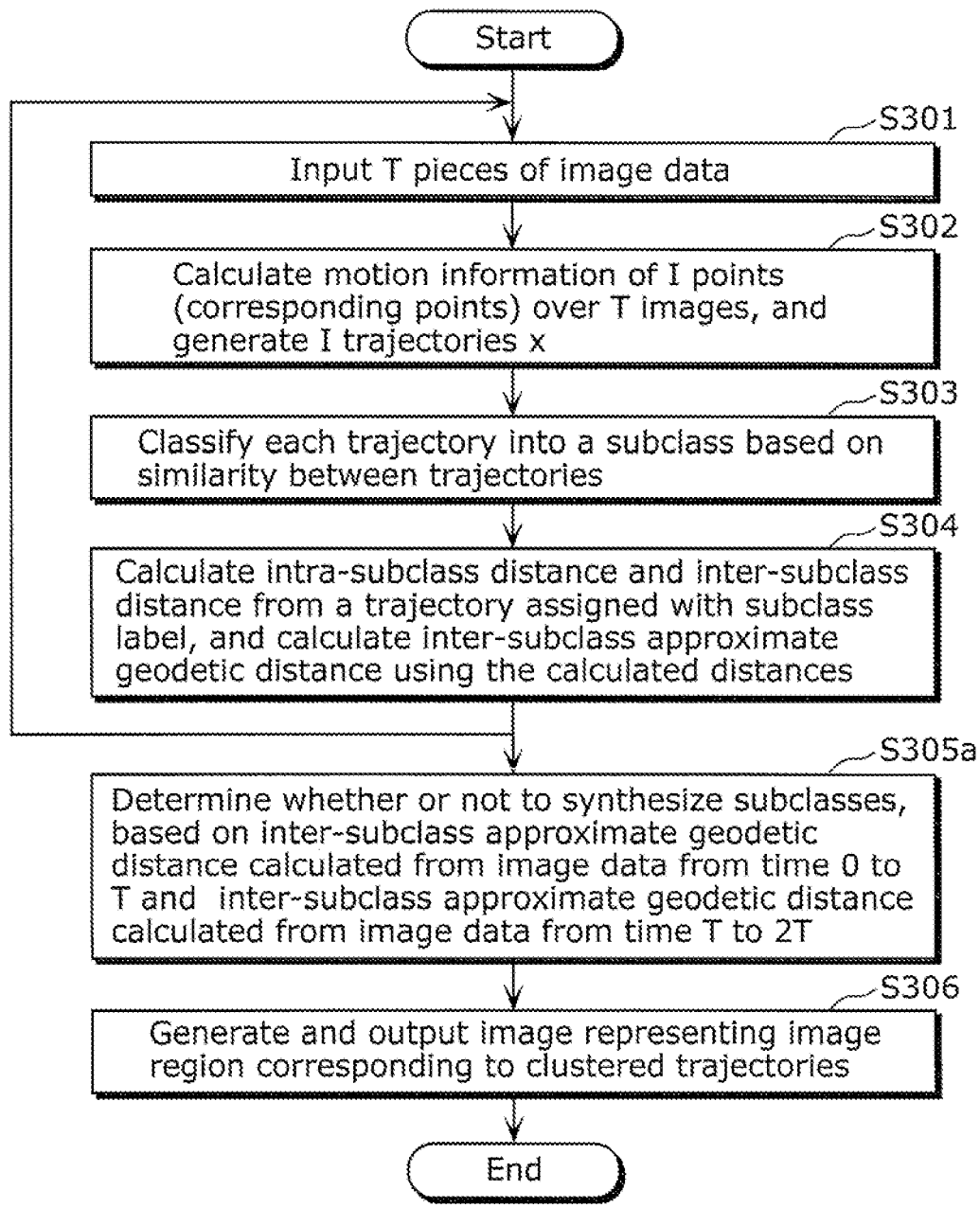
FIG. 13 is a flowchart showing a basic operation of a moving object detection apparatus according to a third embodiment of the present invention.

Hereinafter, an operation of the moving object detection apparatus 100 according to the third embodiment of the present invention will be described with reference to FIG. 13.

First, since the processing performed in the steps from the image input step S301 to the inter-subclass approximate geodetic distance calculating step S304 is the same as the first embodiment, the description thereof will be omitted. Note that the present embodiment is described based on an example of the first embodiment, but the present embodiment is also applicable to the method described in the second embodiment.

Next, in the segmentation step S305a, the segmentation unit 105 determines whether or not to synthesize subclasses, based on temporal variation using the inter-subclass approximate geodetic distance calculated for the images from time 0 to T and the inter-subclass approximate geodetic distance calculated in the same manner for the images from time T to 2T in the processing from steps S301 to S304.

FIG. 14(a) shows temporal variation in each of the geodetic distance (represented by circles in solid line), the inter-subclass approximate geodetic distance (represented by squares in dashed line), and Euclidean distance (represented by triangles in dashed line), based on, as an example, the movement of an articulated object made up of two subclasses Da and Db. Here, since the movements of an object are articulated such as human legs or arms, it is preferable to extract the movements as the same moving object. Here, the temporal variation is not significant in the geodetic distance and the inter-subclass approximate geodetic distance; however, on the other hand, it is possible to predict a large temporal variation in the Euclidean distance. Specifically, the geodetic distance has an advantage of small temporal variation in the distance even for an articulated object, by calculating the distance that tracks the continuously distributed data, and furthermore the inter-subclass approximate geodetic distance achieves the same characteristics as the geodetic distance with a smaller amount of calculation. The geodetic distance is an average of the geodetic distance between subclasses, and the inter-subclass distance is a distance calculated including a minimum value of the linear distance between subclasses. Thus, as shown in FIG. 14(a), the geodetic distance and the inter-subclass approximate geodetic distance are different in distance as an absolute value. However, both the geodetic distance and inter-subclass distance are superior to the Euclidean distance in characteristics that allow a smaller temporal variation in distance even for movement of an articulated object or the like, that is, the characteristics less subject to influences by the posture change of the articulated object. Furthermore, FIG. 14(b) shows a result of an actual experiment. FIG. 14(b) shows an example of two oval objects connected by joints and having articulated motion. The images are collectively input in units of six frames in the image input step S301. FIG. 14(b) is a result of the distance of each type that is calculated using the images of 60 frames. For example, distances obtained from the images from frames 0 to 6 are plotted at a position 0 (frame) on a horizontal axis. Here, the geodetic distance is represented by (circles in solid line), and the inter-subclass approximate geodetic distance is represented by (squares in dashed line), and Euclidean distance represented by (triangles in dashed line). As is clear from FIG. 14(b), each distance represents the same characteristics as in FIG. 14(a), and the geodetic distance and the inter-subclass approximate geodetic distance have a relatively small temporal variation as compared to the temporal variation in Euclidean distance. In other words, these distances have smaller temporal variation in movement of joints, and thus the Euclidean distance has an advantage of making it easier to determine, as the same imaging object, an object having a possibility of being classified as different objects.

Thus, a specific method of determining whether or not to synthesize subclasses according to temporal variation in the inter-subclass approximate geodetic distance will be described in the Expression below.

First, the segmentation unit 105 estimates, based on Expression 24 below, the inter-subclass approximate geodetic distance from time T to 2T, using the inter-subclass approximate geodetic distance calculated from images and trajectories from time 0 to T.

[Math. 31]

$$E(g'_{ab}(2T)) = \frac{\overline{f_{aa}^{Intra}}(2T) + \overline{f_{bb}^{Intra}}(2T)}{\overline{f_{aa}^{Intra}}(T) + \overline{f_{bb}^{Intra}}(T)} g'_{ab}(T) \qquad \text{(Expression 24)}$$

Here, E is an estimated value. In addition,
[Math. 32]

$$\overline{f_{aa}^{Intra}}$$

is an intra-subclass distance, and T corresponds to images from time 0 to T, and 2T corresponds to the intra-subclass distance and inter-subclass approximate geodetic distance that are calculated from the images from time T to 2T.

Note that the intra-subclass distance in Expression 24 is introduced for the purpose of obtaining a normalizing effect particularly when the size of the moving object changes, and thus, when applying the intra-subclass distance to a scene having no variation in the size of the moving object, the following Expression may simply be used.

[Math. 33]

$$E(g'_{ab}(2T))=g'_{ab}(T) \qquad \text{(Expression 25)}$$

Then, the segmentation unit 105 calculates, for the subclasses Da and Db, an absolute value of the difference between an estimated inter-subclass approximate geodetic distance and an actual inter-subclass approximate geodetic distance from time T to 2T as shown in the expression below, and synthesizes the subclasses when temporal variation K in the inter-subclass approximate geodetic distance is equal to or less than a predetermined threshold, and does not synthesize the subclasses when the temporal variation K is larger than the threshold.

[Math. 34]

$$K=|E(g'_{ab}(2T))-g'_{ab}(2T)| \qquad \text{(Expression 26)}$$

The segmentation unit 105 determines whether or not to synthesize subclasses by performing this processing on all the pairs of subclasses, to generate an ultimate class. In the example shown in FIG. 14, when the temporal variation is equal to or less than the threshold, the subclasses Da and Db are synthesized and can be determined as the same moving object. For example, when calculating the inter-subclass approximate geodetic distance by assuming the size of the input image to be 640×480 and segmenting the trajectories into 4×5 grids, and using only a trajectory passing over the grids, it is possible to obtain a satisfactory result when the threshold is approximately 5.0. It is naturally preferable that the above parameter be adjusted according to the size of the image or spatial density of the trajectories (the larger the grid size, the smaller the density). Note that in order to facilitate the description here, the description has been based on an assumption that images from time 0 to T, and images from time T to 2T have been input, but whether or not to synthesize subclasses may be determined based on a longer temporal variation, such as time 0 to T, time T to 2T, time 2T to 3T, ..., (N−1)T to NT.

For example, as shown in FIG. 15(a), the processing in Expression 26 may be performed on each of the images from time 0 to T, T to 2T, ..., (N−1)T to NT, so as to determine, as the temporal variation K, an average of temporal variation K calculated in Expression 26, or a weighted average calculated by giving a larger weight to the temporal average K when the temporal average K is closer to the current time.

Furthermore; in the image input step S301, as shown in FIG. 15(b), images from time 0 to NT are previously input, the processing in the trajectory calculating step S302 and the subclass classification step S303 is performed on the images, and in the inter-subclass approximate geodetic distance calculating step S304, the images are temporally segmented in such a manner as time 0 to T, T to 2T, ..., (N−1)T to NT, and the inter-subclass approximate geodetic distance is calculated using each of the images resulting from the segmentation. Then, in the segmentation step S305a, whether or not to synthesize subclasses may be determined based on the temporal variation in inter-subclass approximate geodetic distance as descried above.

As descried above, according to the third embodiment, by determining whether or not to synthesize classes based on the temporal variation in inter-subclass approximate geodetic distance, the same class label may be assigned to the trajectory belonging to the subclasses determined as the same class. Thus, by collecting the trajectories according to the same class label, it is possible to extract the imaging object as shown in FIG. 9(d). As a result, it is possible to detect the moving object (a region of the moving object) in the image and perform segmentation on the image including the moving object. In addition, since it is not necessary to set a person candidate region as pre-processing, no failure due to a detection error of the person candidate region is caused in the segmentation. As described above, by performing clustering on the nonlinear space, it is possible to reliably detect the imaging object at high speed from an image including a person or the like that moves changing shape, without requiring fitting of a vast amount of parameters.

In other words, using temporal variation in inter-subclass approximate geodetic distance produces an advantageous effect of allowing performing regional segmentation on the movement as well as expansion and reduction of the object including joints, as one imaging object. In addition, it is possible to correctly extract, with a smaller amount calculation, a region from an image including a moving object that moves changing shape such as a person, without being influenced by the posture or size of the moving object, while keeping the characteristics of the geodetic distance which can efficiently represent the data that is continuously and nonlinearly distributed.

In addition, it is also possible to correctly detect the moving object and extract a region of the moving object at high speed, from an image including a moving object that moves changing shape such as a person, without being influenced by the posture or size of the moving object. Furthermore, it is also possible to predict the movement of the moving object and so on, using the result of the detection and region extraction.

Thus, today, with video capturing apparatuses such as a digital camcorder becoming widely used, the present invention provides an extremely high practical value as technology applied to: focus control and image quality improvement processing in digital cameras; a driving safety support system for vehicles; or collision avoidance control to avoid collision against a person and alarming using a robot.

[First Variation of First to Third Embodiments]

Next, a moving object detection apparatus according to a first variation of the first to the third embodiments will be described. Here described is an example of adding a function to record and transmit the result of detecting the moving object for each detected region after the class determination performed in the first to the third embodiments. Note that a variation according to the first embodiment is described, but the variation is also applicable to the second and the third embodiments.

Figure 16:
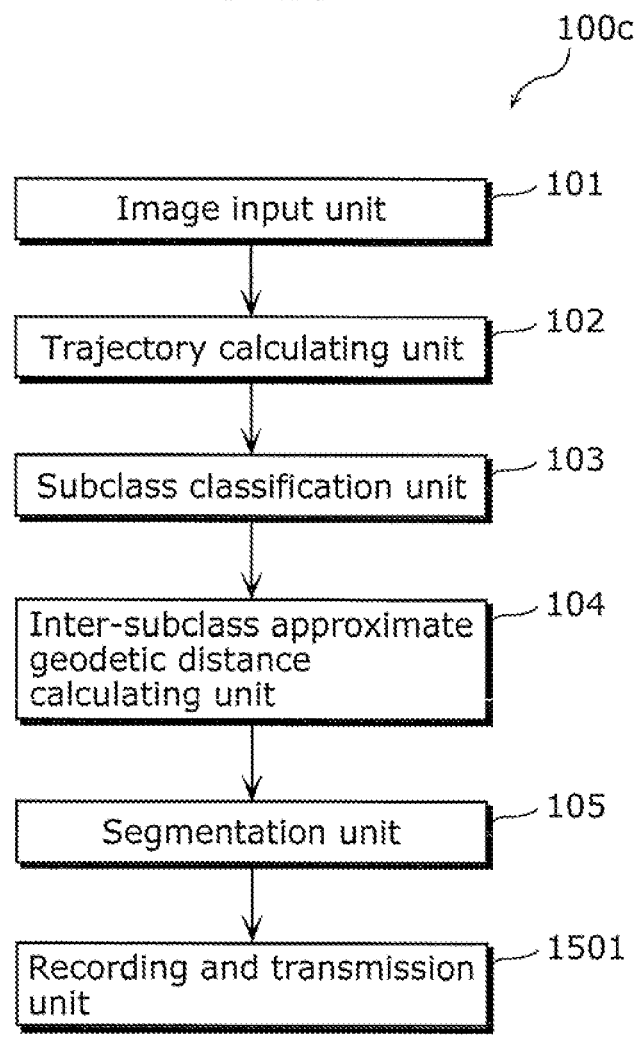
FIG. 16 is a diagram showing a basic configuration of a moving object detection apparatus according to a first variation of the first to the third embodiments of the present invention.

As shown in FIG. 16, such a moving object detection apparatus 100c according to the first variation can be realized by adding a recording and transmission unit 1501 to: the image input unit 101, the trajectory calculating unit 102, the subclass classification unit 103, the inter-subclass approximate geodetic distance calculating unit 104, and the segmentation unit 105.

The recording and transmission unit 1501 is a processing unit which specifies the imaging object region in the pictures received by the image input unit 101, based on the result of the imaging object detection in the segmentation unit 105, and records information for indicating the imaging object region onto a recording medium such as a memory or a hard disk, or transmits the information to the outside through a communication interface or the like. In other words, the recording and transmission, unit 1501 separately records and transmits each image indicating the result of the imaging object detection according to the class label $\theta_m$, as with the case of the image display. In addition, by averaging motion information belonging to each class as in Expressions 27 and 28 below, it is also possible to compress the motion information. Normally it is necessary to hold motion information for each pixel, but by performing averaging processing on the motion information, it is only necessary to hold only a piece of motion information per object. For example, when using, as motion information, the motion vector $(u_t^i, v_t^i)$ of the pixel i, the recording and transmission unit 1501 can calculate the averaged motion information for each region resulting from the segmentation, as shown in Expressions 27 and 28 below.

[Math. 35]

$$u_t^m = \frac{1}{C_m} \sum_{c_m=1}^{C_m} u_t^{c_m}$$ (Expression 27)

[Math. 36]

$$v_t^m = \frac{1}{C_m} \sum_{c_m=1}^{C_m} v_t^{c_m}$$ (Expression 28)

Here, $C_m$ is the number of pixels or the number of trajectories that belong to the class $\theta_m$. Each of $u_t^{c_m}$ and $v_t^{c_m}$ is a motion vector of a pixel belonging to the class $\theta_m$. FIG. 17 is information for classifying t images from time T as an input, and indicating an imaging object region that is specified using the result. The recording and transmission unit 1501 records and transmits: each class label $\theta_m$ as an identifier; the pixel position and the pixel value of the picture at time T which belong to each of class labels $\theta_1$ and $\theta_2$; and a motion vector $u_T^m, v_T^m, u_{T+1}^m, v_{T+1}^m, \ldots, u_{T+t}^m, v_{T+t}^m$, from time T to time T+t corresponding to each of the class labels. Naturally, instead of using the pixel position and the pixel value of the image, the recording and transmission unit 1501 may attach each class label to a picture at time T on a per-pixel basis, and transmit the picture. This only requires transmitting motion information whose amount is equivalent to the number of classes, thus producing an advantageous effect of allowing more efficient recording and transmission of the information for indicating the imaging object region than in the case of transmitting the t pictures. Particularly, the smaller the number of classes compared to the number of pixels is, the more efficient the information indicating the imaging object region can be recorded and transmitted.

[Second Variation of First to Third Embodiments]

Next, the following will describe, as a second variation of the is first to the third embodiments of the present invention, the moving object detection apparatus that additionally has a function to predict the motion of the moving object from the result of the moving object detection. Here, the description will be given according to the first embodiment, but the moving object detection apparatus is also applicable in the second and the third embodiments.

Figure 18:
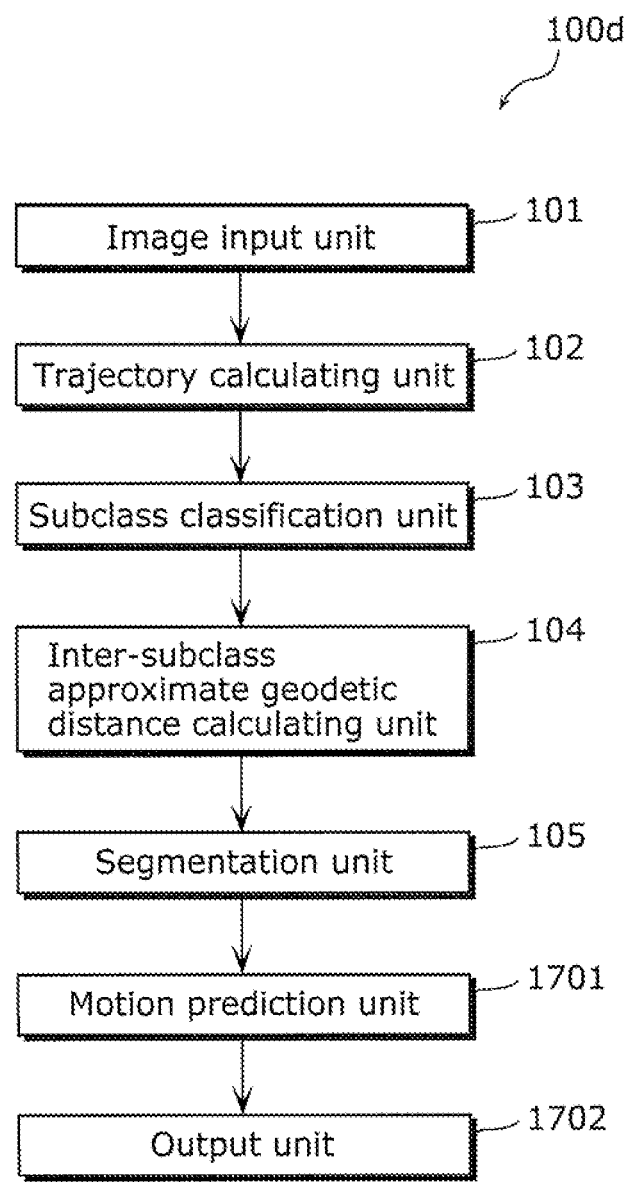
FIG. 18 is a diagram showing an example of a configuration of a moving object detection apparatus according to a second variation of the first to the third embodiments of the present invention.

As shown in FIG. 18, a moving object detection apparatus 100*d* according to the second variation has a function to predict the motion of the moving object by adding a motion prediction unit 1701 and an output unit 1702 to: the image input unit 101, the trajectory calculating unit 102, the sub-class classification unit 103, the inter-subclass approximate geodetic distance calculating unit 104, and the segmentation unit 105.

The motion prediction unit 1701 calculates a representative trajectory from among the trajectories of the pixel included in each class, from the result of the imaging object detection, and predicts the motion of the moving object based on the representative trajectory, so as to predict the position of the moving object or the position of a region of the moving object.

The output unit 1702 outputs the position of the moving object or the position of the region of the moving object that is predicted by the motion prediction unit 1701.

Figure 19:
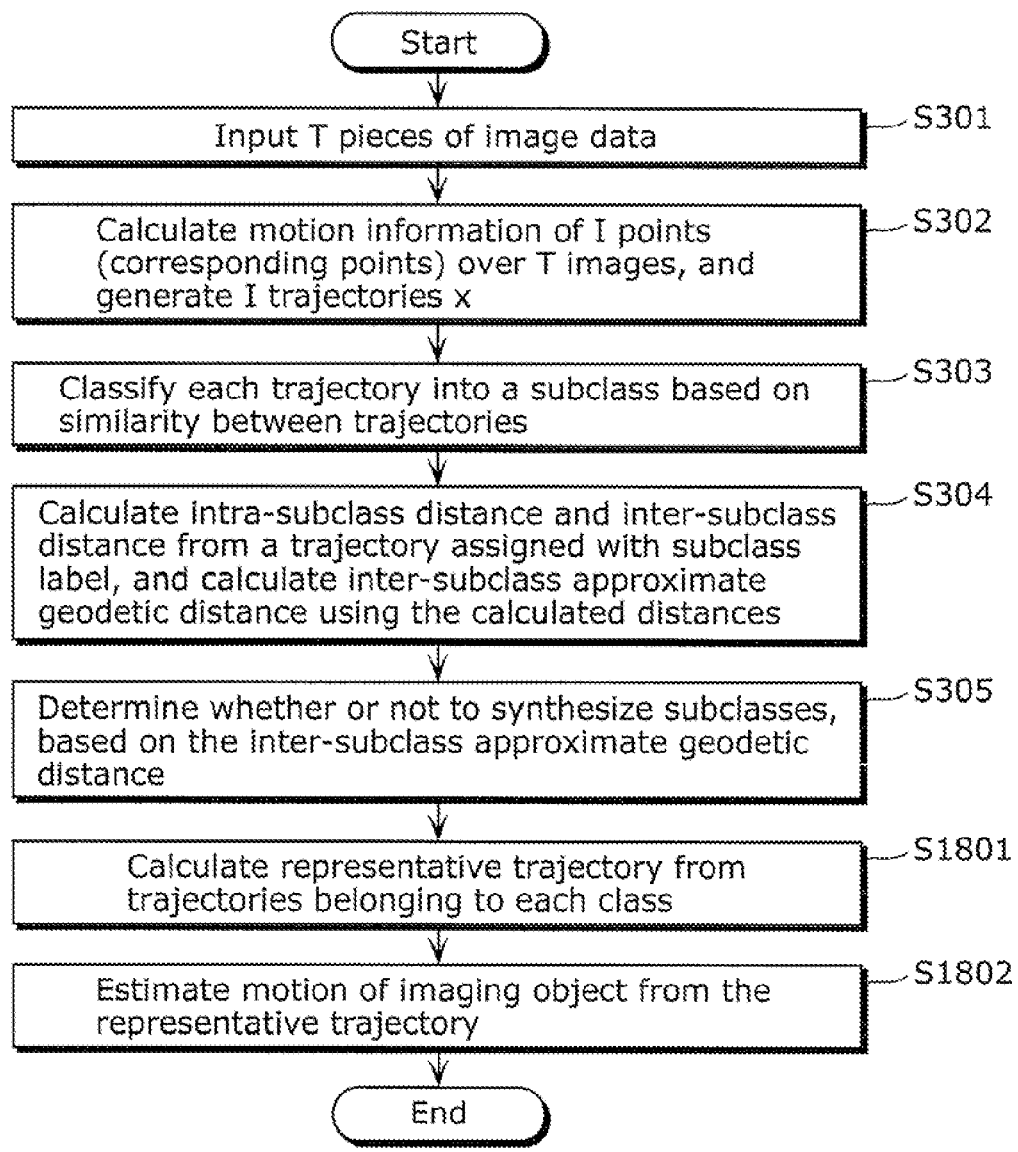
FIG. 19 is a flowchart showing a basic operation of the moving object detection apparatus according to the second variation of the first to the third embodiments of the present invention.

FIG. 19 shows a flowchart of the processing performed by the moving object detection apparatus 100*d* according to the second variation. Since steps S301 to S305 are the same as those in the first embodiment, the description thereof will be omitted.

Next, in step S1801, the motion prediction unit 1701 calculates, from trajectories belonging to each class, a representative point of the class and a trajectory of the representative point, based on the result of the imaging object detection performed by the segmentation unit 105.

Here, trajectories of pixels belonging to the class $\theta_m$ are represented as $x^{Cm}$. The motion prediction unit 1701 calculates a representative trajectory for each class $\theta_m$, based on Expression 29 below. Here, an example of calculating an average trajectory as the representative trajectory is described, but the weighting or the like may be performed with respect to each of the trajectories $X^{Cm}$ of a pixel on the calculation below, or the movement trajectory of the pixel corresponding to a centroid of a class on the image may be considered as the representative trajectory.

[Math. 37]

$$\overline{x^m} = \frac{1}{C_m}\sum_{c=1}^{C_m} x^{cm}$$ (Expression 29)

Here, $C_m$ is the number of pixels or the number of trajectories of a pixel that belong to the class $\theta_m$.

Figure 20:
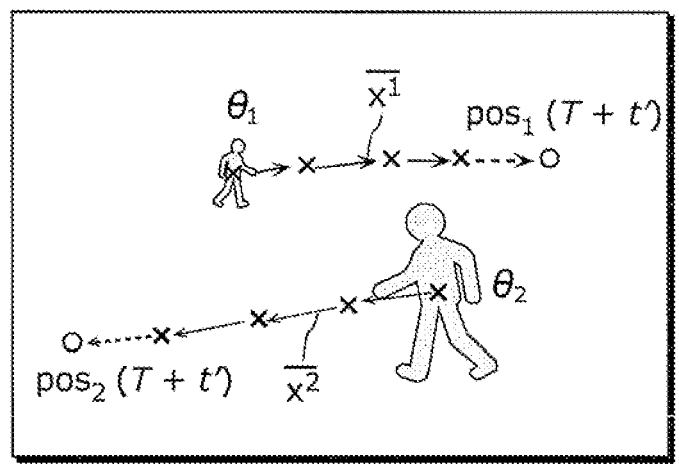
FIG. 20 is a diagram showing an example of motion prediction according to the second embodiment of the present invention.

FIG. 20 shows an example of calculating the representative trajectory for each class $\theta_m$, based on Expression 29 above. FIG. 20 only shows a representative trajectory for each of a class $\theta_1$ corresponding to a certain moving object and a class $\theta_2$ corresponding to another moving object. Each x in the figure shows a pixel position that is an element of

[Math. 38]

$$\overline{x^m}$$

which is the representative trajectory corresponding to time t. According to this method, as compared to the method of simply calculating a temporal average of trajectories of an adjacent pixel, it is possible to calculate the representative trajectory using only the trajectories of the pixel that is similar in motion. This allows calculating the representative trajectory with higher accuracy. Thus, by calculating the representative trajectory for each class, it is possible to represent, accurately and easily, the motion of each imaging object or the motion of each region.

Next, in step S1802, the motion prediction unit 1701 predicts the position of the moving object at time earlier than time T, from the representative trajectory calculated in step S1801. First, an example of calculating acceleration from the representative trajectory and predicting the position of the moving object after time T+1 is described. In the case where three or more temporally-sequential images are input, an acceleration vector $s^m$ can be obtained for each representative trajectory

[Math. 39]

$$\overline{x^m}$$

as shown in Expression 30 below.

[Math. 40]

$$s_{t+1}^m = \{u_{t+1}^{m}-u_t^m\}-\{u_t^m-u_{t-1}^m\}$$ (Expression 30)

Here, $u_t^m$ is a motion vector and can be represented by Expression 31 below.

[Math. 41]

$$u_t^m=(u_t^m, v_t^m)$$ (Expression 31)

Using the acceleration vector in Expression 30, as shown by dashed arrows and circles, the motion prediction unit 1701 can predict, for each moving object, pos$_m$(T+t') that is the position of the moving object at time T+t' according to Expression 32 below. Here, the moving object has been given as an example, but it is also possible to predict the position of each region of the moving object, by increasing the number of classes in the segmentation unit 105 according to the first embodiment or decreasing the threshold in the segmentation unit 105 according to the third embodiment.

[Math. 42]

$$pos_m(T+t') = pos_m(T) + t'u_T^m + \frac{1}{2}t'^2 s_T^m$$ (Expression 32)

Then, the output unit 1702 outputs the position of the moving object or the position of the region of the moving object that is predicted in step S1802. This allows motion prediction considering acceleration. When the motion suddenly becomes quick or suddenly stops, this produces an advantageous effect of allowing predicting the to position of the moving object by reflecting the acceleration. In addition, an affine parameter may be used instead of the motion vector.

Since the affine parameter allows representing motions including rotation and is appropriate for representing rotational movement of arms or legs, it is possible to correctly predict, particularly, the position of an articulated object.

Furthermore, instead of the motion vector and acceleration described above, it is also possible to fit an Nth-order function directly to the representative trajectory $x^m$. When temporally sequential T images are input, the Nth-order function can be fit to positional information on the T images, which is included in

[Math. 43]

$$\overline{x^m}$$

that is the representative trajectory. This allows estimating the position $pos_m(T+t')$ on the image at time $(T+t')$ to be closer to the fitted value. Specifically, since the fitting using the function allows representing smoother movement, it is possible to perform prediction with higher accuracy. Particularly, since this allows prediction according to the fitted function, the motion prediction is more accurate when the fitted function is closer to an original motion. Naturally, the position prediction on these images is also applicable to temporal interpolation.

As described above, according to the present variation, the trajectories of pixels having similar motions can be calculated as the same class, thus allowing obtaining the representative trajectory with high accuracy. Particularly, for an articulated object or the like, it is possible to represent the motion of each imaging object or each region, thus producing an advantageous effect of allowing predicting the position of the region in the moving object with high accuracy without setting a human candidate region as pre-processing.

[Third Variation of First to Third Embodiments]

Next, a moving object detection system according to a third variation of the first to the third embodiments will be described. Here, an example of using two different devices for the processing from the first to the third embodiments, according to the amount of memory necessary for operation will be described. Specifically, the moving object detection system includes a moving object detection data generating apparatus and a moving object detection apparatus. The moving object detection data generating apparatus performs processing which requires a larger amount of memory. The moving object detection data generating apparatus is realized using a device having a larger memory capacity and a higher processing speed, such as a personal computer. The moving object detection apparatus performs processing requiring a memory smaller than the amount of memory required for the processing by the moving object detection data generating apparatus. The moving object detection apparatus is realized by a device having a smaller memory capacity and a lower processing speed, such as a cellular phone or mobile terminal.

The following will describe the third variation of the first to the third embodiments according to the first embodiment with reference to the drawings, but the third variation is also applicable to the second and third embodiments in the same manner.

Figure 21:
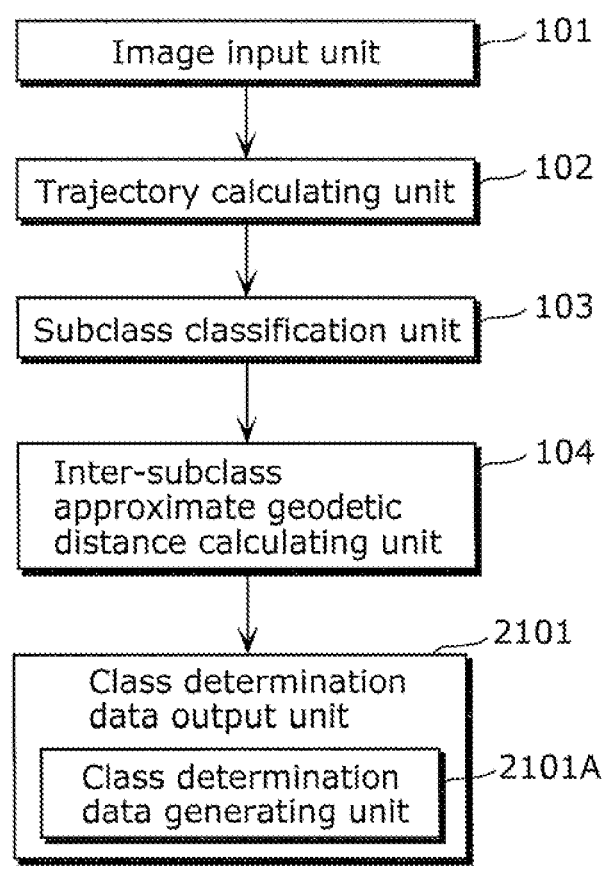
FIG. 21 is a block diagram showing a functional configuration of a moving object detection data generating apparatus according to a third variation of the present invention.

FIG. 21 is a block diagram showing a functional configuration of the moving object detection data generating apparatus in the third variation of the first embodiment. The moving object detection data generating apparatus includes: the image input unit 101, the trajectory calculating unit 102, the subclass classification unit 103, the inter-subclass approximate geodetic distance calculating unit 104, and a class determination data output unit 2101. The processing performed by the units from the image input unit 101 to the inter-subclass approximate geodetic distance calculating unit 104 are the same as the processing shown in the first embodiment. In other words, each of the image input unit 101, the trajectory calculating unit 102, the subclass classification unit 103, and the inter-subclass approximate geodetic distance calculating unit 104 performs the processing in a corresponding one of the image input step S301, the trajectory calculating step S302, the subclass classification step S303, and the inter-subclass approximate geodetic distance calculating step S304 that are shown in FIG. 3. The following will complement an important part of the present variation.

In the subclass classification step S303, the subclass classification unit 103 classifies I trajectories into S subclasses. Note that I>S. Here, as described earlier, when calculating the geodetic distance using the Dijkstra method disclosed in Non-Patent Reference 7, the order of the amount of calculation is $N^2 \log N$ where N is the number of data points (the number of trajectories). In this context, since it is necessary to store a distance between arbitrary data points into the memory, an amount of memory $N^2$ that is equivalent to a square of the number of trajectories is required.

In contrast, the inter-subclass approximate geodetic distance calculating unit 104 calculates, in step S304, the inter-subclass approximate geodetic distance having the same characteristics as the geodetic distance. Here, the inter-subclass approximate geodetic distance has an advantage of not only reducing the amount of calculation as described earlier but also realizing the reduced amount of calculation using the amount of memory for storing data of an amount $S^2$. Note that because N>S, it is possible to significantly reduce the amount of memory. For example, when performing processing such that 100 similar trajectories are classified into one subclass, it is possible to reduce the amount of memory related to the geodetic distance to 1/10000.

Next, the class determination data output unit 2101 will be described. The class determination data output unit 2101 records, onto a recording medium, information described below. As the recording medium, a secure digital (SD) card, a USB memory, a mobile hard disc, a compact disc (CD), a digital versatile disc (DVD), and so on may be used.

Figure 22:
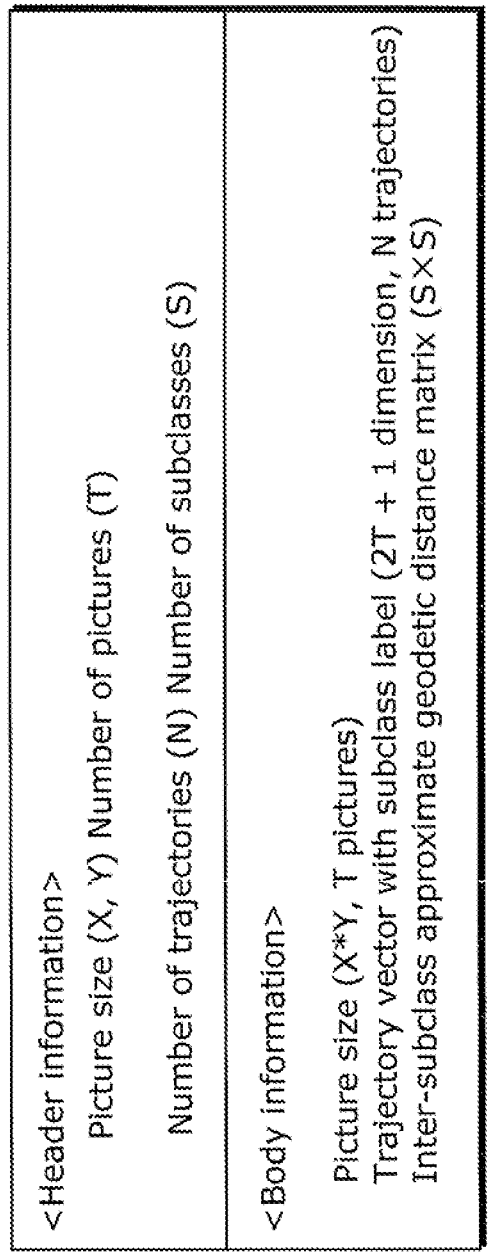
FIG. 22 is a diagram showing a data configuration of information recorded on a recording medium.

As shown in FIG. 22, the information to be recorded onto the recording medium includes header information and body information.

The header information includes: a size (X, Y) of pictures included in the video; the number of the pictures included in the video (T); the number of trajectories obtained from the video (N); and the number of subclasses (S) each of which is a set of similar trajectories.

Figure 23:
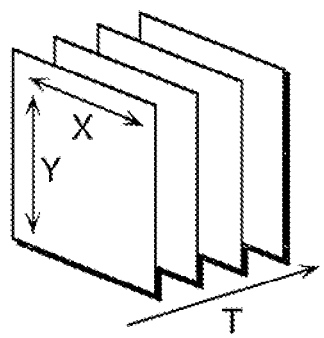
FIG. 23 is a diagram for describing a picture size (X,Y) and the number of pictures (T)

FIG. 23 is a diagram for describing the picture size (X, Y) and the number of pictures (T). As shown in FIG. 23, the video includes T pictures, and the size of each picture is X×Y pixels.

Figure 24:
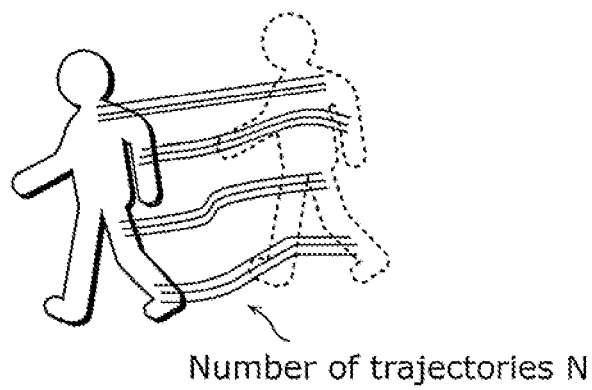
FIG. 24 is a diagram for describing the number of trajectories (N)

FIG. 24 is a diagram for describing the number of trajectories (N). As shown in FIG. 24, it is assumed that N trajectories represented by straight lines or curved lines are obtained from the video. In an example shown in FIG. 24, N=12.

Figure 25:
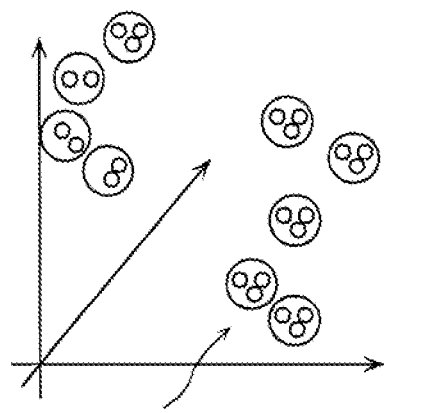
FIG. 25 is a diagram for describing the number of subclasses (S)

FIG. 25 is a diagram for describing the number of subclasses (S). Each of nine large circles represents a subclass, and a small circle included in each of the large circles represents a trajectory within the same subclass. In the example of FIG. 25, S=9.

The body information includes: the number of pictures included in the video; a trajectory vector with a subclass label; and an inter-subclass approximate geodetic distance matrix.

Figure 26:
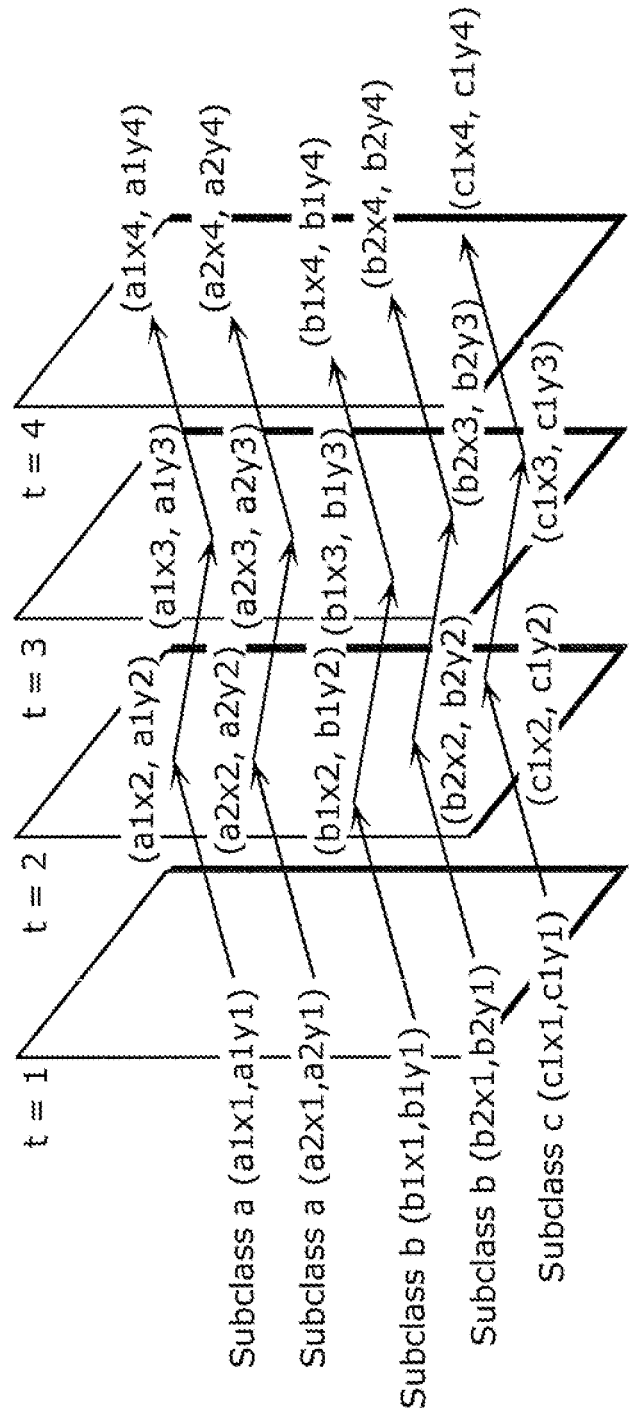
FIG. 26 is a diagram for describing a trajectory vector with a subclass label.

The trajectory vector with a subclass label includes data indicating the trajectories indicated by the number of trajectories obtained from the video, and data indicating the subclass to which each of the trajectories belongs. FIG. 26 is a diagram for describing the trajectory vector with a subclass label. FIG. 26 shows five trajectory vectors with subclass labels. For example, the trajectory to with a subclass label on the top will be described. The trajectory vector with a subclass label is a vector indicating that the trajectory belongs to a subclass a, and that coordinates of the trajectory in four pictures (t=1 to 4) are: (a1x1, a1y1), (a1x2, a1y2), (a1x3, a1y3), and (a1x4, a1y4).

Figure 8:
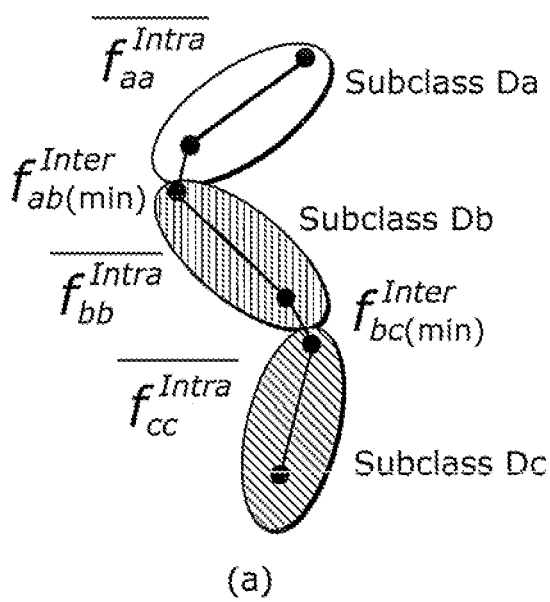
FIG. 8 is a diagram showing an example of a method of calculating an inter-subclass approximate geodetic distance according to the first embodiment of the present invention.

The inter-subclass approximate geodetic distance matrix is a matrix shown in FIG. 8(*b*), and is a matrix including, for each subclass, an inter-subclass approximate geodetic distance representing similarity between the subclass and another subclass.

FIG. 27 is a diagram showing a specific example of information recorded on a recording medium. As shown in the figure, in the header information, 640, 480, 4, 5, and 3 are recorded, respectively, as: the picture size (X), the picture size (Y), the number of pictures (T), the number of trajectories (N), and the number of subclasses (S). Note that the description here is given using specific values of the picture size (X), the picture size (Y), the number of pictures (T), and the number of trajectories (N), and the number of subclasses (S), but such numbers are not limited to the respective values.

In addition, the body information includes: image data of four pictures; a trajectory vector with a subclass label for each of the five trajectories; and an inter-subclass approximate geodetic distance matrix. For example, a first trajectory vector with a subclass label is (a a1x1 a1y1 a1x2 a1y2 a1x3 a1y3 a1x4 a1y4), and indicates information of the trajectory vector with a subclass label on the top in FIG. 26 as described above. The inter-subclass approximate geodetic distance matrix records an intra-subclass distance or an inter-subclass approximate geodetic distance for all combinations of subclasses. For example, a column (a, a) records an intra-subclass distance $f_{aa}^{Intra}$ between the subclass a and the subclass a, and a column (a, b) records an inter-subclass approximate geodetic distance $g_{ab}'$ between the subclass a and a subclass b.

Note that this information to be recorded on the recording medium is generated by a class determination data generating unit 2101A included in the class determination data output unit 2101. For example, the class determination data generating unit 2101A obtains, from the image input unit 101, the picture size (X, Y), the picture size (Y), the number of pictures (T), and the image data. The class determination data generating unit 2101A obtains the number of trajectories from the trajectory calculating unit 102. The class determination data generating unit 2101A obtains the number of subclasses (S) from the subclass classification unit 103. The class determination data generating unit 2101A obtains, from the trajectory calculating unit 102, the data indicating the trajectory from among trajectory vectors with subclass labels, and obtains the data indicating the subclass from the subclass classification unit 103. The class determination data generating unit 2101A obtains the inter-subclass approximate geodetic distance matrix from the inter-subclass approximate geodetic distance calculating unit 104. The class determination data generating unit 2101A collects these information items obtained, and generate the information to be recorded on the recording medium.

By previously recording the inter-subclass approximate geodetic distance matrix on the recording medium, it is possible to reduce the amount of memory from a memory capacity of $N^2$ data to a memory capacity of $S^2$(N>S) data. Accordingly, using the recording medium above, it is possible to perform processing using a moving object detection apparatus having a smaller amount of memory than the amount of memory of the moving object detection data generating apparatus.

Figure 28:
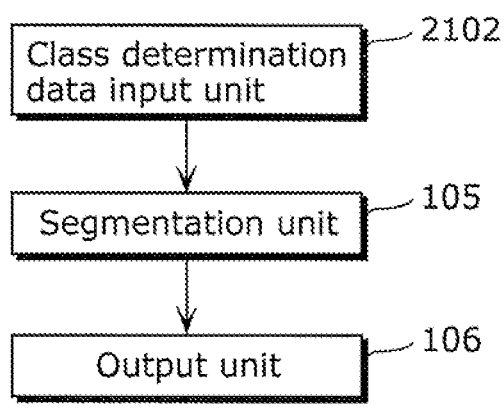
FIG. 28 is a block diagram showing a functional configuration of a moving object detection apparatus.

Next, the moving object detection apparatus will be described. FIG. 28 is a block diagram showing a functional configuration of the moving object detection apparatus. The moving object detection apparatus is an apparatus which detects a moving object in video by performing segmentation on an image to specify all or part of regions of the moving object in the video, and includes the class determination data input unit 2102, the segmentation unit 105, and the output unit 106. The class determination data input unit 2102 reads, from the recording medium, the data recorded on the recording medium. The segmentation unit 105 performs segmentation based on the data read by the class determination data input unit 2102. The processing performed by the segmentation unit 105 and the output unit 106 is the same as the processing shown in the first embodiment. In other words, the segmentation unit 105 and the output unit 106 perform, respectively, the segmentation step S305 and the image output step S306 shown in FIG. 3.

The class determination data input unit 2102 reads header information from the recording medium and secures a memory (storage region) in accordance with the image size of the T input pictures (X×Y×T). Next, the class determination data input unit 2102 secures a memory for storing data of (2T+1)×N, from the number of trajectories N and the number of pictures T. Here, since each trajectory vector is made up of two-dimensional pixel coordinates as shown in Expression 1, a memory for storing the 2T pixel coordinates is required, and furthermore, since each trajectory vector is assigned with a subclass label, a memory for storing such subclass labels is required. Then, the class determination data input unit 2102 secures a memory for storing $S^2$ data required for holding the inter-subclass approximate geodetic distance matrix, from the number of subclasses S in the header information. The class determination data input unit 2102, after securing the memory above, reads each information item. Note that the inter-subclass approximate geodetic distance matrix is a symmetric matrix, and thus, in practice, it is only necessary to secure a memory for storing $_sC_2$ data for holding the inter-subclass approximate geodetic distance.

Next, in the segmentation step S305, the segmentation unit 105 determines whether or not to synthesize sets of similar trajectories (subclasses), using the inter-subclass approximate geodetic distance. Since the specific method is the same as the method used in the first embodiment, the description thereof will be omitted.

In addition, in the image output step S306, the output unit 106 outputs the result of detecting the moving object in the video, which is performed by the segmentation unit 105. Since the specific method is the same as the method used in the first embodiment, the description thereof will be omitted.

As described above, the trajectories and the inter-subclass approximate geodetic distances are calculated using the moving object detection data generating apparatus, to be stored on the recording medium. Then, via the recording medium, it is possible to extract the imaging object by performing segmentation using the moving object detection apparatus.

Thus, by holding, as a header, the information on the picture size, the number of pictures, the number of trajectories, and the number of subclasses, it is possible to secure a memory for the information required by the moving object detection apparatus to perform the segmentation. In addition, since the inter-subclass approximate geodetic distance matrix is used as the information required for the segmentation, this produces an advantageous effect of allowing segmentation with a smaller memory amount as compared to the case of performing segmentation using a geodetic distance matrix that is a matrix of geodetic distances between trajectories.

This has an advantage of allowing a device having a limited memory capacity to be used as a moving object detection apparatus. For example, in a mobile device such as a cellular phone, by using a result of the region extraction according to the present variation, it is possible to highlight a particular imaging object for zoom display or track the imaging object.

Note that the moving object detection data generating apparatus may output, to the recording medium, the data including at least the inter-subclass approximate geodetic distance as the minimum data for performing segmentation in the moving object detection apparatus. In addition, the moving object detection apparatus may receive the data including at least the inter-subclass approximate geodetic distance from the recording medium, so as to perform segmentation. In this case, the output unit 106 need not necessarily be included.

Thus far, the moving object detection method and the moving object detection apparatus according to the present invention have been described based on the embodiments and the variations thereof, but the present invention is not limited to these embodiments and variations. Those skilled in the art will readily appreciate that many modifications are possible in the exemplary embodiments without departing from the novel teachings and advantages of this invention. Accordingly, all such modifications are intended to be included within the scope of this invention.

In addition, the present invention also includes a mode realized by an arbitrary combination of characteristic constituent elements in each of the embodiments.

In addition, the moving object detection apparatus in the embodiments above includes the image input unit 101 and the trajectory calculating unit 102, but these constituent elements are not essential according to the present invention. In other words, when trajectories of images in each of the plurality of blocks included in the video are previously calculated, the moving object detection apparatus 100 may obtain such trajectories from the outside, and perform the processing in steps S303 to S306 on the obtained trajectories.

In addition, the present invention has been realized as a moving object detection apparatus, but it goes without saying that the present invention can extract a region of an objet having motion in video or can be realized as an image processing device for segmentation.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The present invention can be realized as a moving object detection apparatus or the like which detects, based on motion in a plurality of pictures, a moving object in video by performing region extraction on a region from an image including the moving object that moves changing shape such as a person, and is applicable as a moving object detection device or the like that is to be incorporated in, for example, a motion analysis apparatus, a monitoring apparatus, and an audio-visual device such as a camcorder or a television set.

What is claimed is:

1. A moving object detection apparatus which detects a moving object in video by performing segmentation on an image to specify all or part of regions of the moving object in the video, said moving object detection apparatus comprising:
    an image input unit configured to receive input of a plurality of pictures included in the video;
    a trajectory calculating unit configured to calculate a plurality of trajectories by detecting, for each block including at least one pixel that is included in one of the received pictures, a motion of the block between two pictures included in the video, and concatenating detected motions for the plurality of pictures;
    a subclass classification unit configured to classify the calculated trajectories into a plurality of subclasses each of which is a set of similar trajectories;
    an inter-subclass approximate geodetic distance calculating unit configured to calculate, for each of the subclasses, an inter-subclass approximate geodetic distance which represents similarity between the subclass and another one of the subclasses, using an inter-subclass distance that is a distance including a minimum value of a linear distance between each of trajectories belonging to the subclass and one of trajectories belonging to the other one of the subclasses; and
    a segmentation unit configured to perform segmentation by specifying, based on the calculated inter-subclass approximate geodetic distance, a set of subclasses including similar trajectories as a class.

2. The moving object detection apparatus according to claim 1,
    wherein said inter-subclass approximate geodetic distance calculating unit is configured to calculate, for each of the subclasses, as the inter-subclass approximate geodetic distance between the subclass and the other one of the subclasses, a distance that is a sum of: an intra-subclass distance representing similarity between trajectories belonging to the subclass; an intra-subclass distance representing similarity between trajectories belonging to the other one of the subclasses; and the inter-subclass distance between the subclass and the other one of the subclasses.

3. The moving object detection apparatus according to claim 2,
    wherein said inter-subclass approximate geodetic distance calculating unit is configured to calculate, for each of the subclasses, as the intra-subclass distance of the subclass, an average, mode, or median of a linear distance between the trajectories belonging to the subclass.

4. The moving object detection apparatus according to claim 2,
    wherein said segmentation unit is further configured to calculate, as the inter-subclass approximate geodetic distance, a distance calculated by normalizing, using the intra-subclass distances, the inter-subclass approximate geodetic distance between two subclasses.

5. The moving object detection apparatus according to claim 1,
    wherein said inter-subclass approximate geodetic distance calculating unit is configured to calculate, when the minimum value is larger than a predetermined threshold, the inter-subclass approximate geodetic distance by performing nonlinearization for transforming the inter-subclass approximate geodetic distance into an infinite value.

6. The moving object detection apparatus according to claim 5,
wherein said inter-subclass approximate geodetic distance calculating unit is configured to compare an inter-subclass approximate geodetic distance between a first subclass and a second subclass, and a sum of an inter-subclass approximate geodetic distance between the first subclass and a third subclass and an inter-subclass approximate geodetic distance between the third subclass and the second subclass, and to calculate a smaller value as the inter-subclass approximate geodetic distance between the first subclass and the second subclass.

7. The moving object detection apparatus according to claim 1,
wherein said segmentation unit is configured to perform segmentation by specifying, based on temporal variation in the inter-subclass approximate geodetic distance, the set of subclasses including similar trajectories as the class representing a region.

8. The moving object detection apparatus according to claim 7,
wherein said segmentation unit is configured to perform segmentation by determining that the two subclasses belong to a same class, when a value indicating the temporal variation in the inter-subclass approximate geodetic distance between the two subclasses is equal to or less than a predetermined threshold for the temporal variation.

9. The moving object detection apparatus according to claim 7,
wherein said segmentation unit is configured to perform segmentation by determining that the two subclasses belong to different classes, when a value indicating the temporal variation in the inter-subclass approximate geodetic distance between the two subclasses is larger than a predetermined threshold for the temporal variation.

10. The moving object detection apparatus according to claim 1,
wherein said inter-subclass approximate geodetic distance calculating unit is configured to determine, for each of the subclasses, as the inter-subclass distance between the subclass and the other one of the subclasses, an average of a predetermined number of distances selected, in ascending order, from among distances between the each of the trajectories belonging to the subclass and the one of the trajectories belonging to the other one of the subclasses.

11. The moving object detection apparatus according to claim 1,
wherein said inter-subclass approximate geodetic distance calculating unit is configured to determine, for each of the subclasses, as the inter-subclass distance between the subclass and the other one of the subclasses, an average of distances equal to or less than a predetermined threshold, from among distances between the each of the trajectories belonging to the subclass and the one of the trajectories belonging to the other one of the subclasses.

12. The moving object detection apparatus according to claim 1,
wherein said subclass classification unit is configured to classify the trajectories into the subclasses by classifying similar trajectories into a same subclass, from among the calculated trajectories.

13. The moving object detection apparatus according to claim 12,
wherein said subclass classification unit is configured to classify the trajectories into the subclasses by repeatedly performing, predetermined times or until the trajectories are classified into a predetermined number of subclasses, processing for classifying, into a same subclass, trajectories having highest similarity from among the calculated trajectories.

14. The moving object detection apparatus according to claim 1,
wherein said subclass classification unit is configured to classify the trajectories into the subclasses by segmenting, into a plurality of regions, at least one of the pictures received by said image input unit, using at least one of edge information, color information, and brightness information of the at least one of the pictures, and classifying, into a same subclass, trajectories passing through each of the regions resulting from the segmentation.

15. The moving object detection apparatus according to claim 1, further comprising
an output unit configured to perform image processing on at least one of the pictures received by said image input unit such that each of the regions specified by the segmentation performed by said segmentation unit is displayed in a mode different from a mode in which another one of the specified regions is displayed, and to output a picture including the region on which the image processing has been performed.

16. The moving object detection apparatus according to claim 1, further comprising
a recording and transmission unit configured to write onto a recording medium or transmit to an outside via a transmission path, at least one of the pictures that is assigned with a result of the segmentation performed by said segmentation unit, the pictures being received by said image input unit.

17. The moving object detection apparatus according to claim 1, further comprising
a prediction unit configured to calculate a representative trajectory that represents the class specified by said segmentation unit from among the trajectories included in the class, and to predict, according to the calculated representative trajectory, a motion of the moving object by predicting that a region corresponding to the class moves between pictures.

18. A method of detecting a moving object in video by performing segmentation on an image to specify all or part of regions of the moving object in the video, said method comprising:
receiving input of a plurality of pictures included in the video;
calculating a plurality of trajectories by detecting, for each block including at least one pixel that is included in one of the received pictures, a motion of the block between two pictures included in the video, and concatenating detected motions for the pictures;
classifying the calculated trajectories into a plurality of subclasses each of which is a set of similar trajectories;
calculating, for each of the subclasses, an inter-subclass approximate geodetic distance which represents similarity between the subclass and another one of the subclasses, using an inter-subclass distance that is a distance including a minimum value of a linear distance between each of trajectories belonging to the subclass and one of trajectories belonging to the other one of the subclasses; and performing segmentation by specifying, based on the calculated inter-subclass approximate geodetic distance, a set of subclasses including similar trajectories as a class.

19. A non-transitory computer-readable recording medium having stored thereon a program for detecting a moving object in video by performing segmentation for specifying all or part of regions included in the moving object in the video, said program causing a computer to execute steps included in the method of detecting a moving object according to claim 18.

20. A moving object detection data generating apparatus comprising:
- an image input unit configured to receive input of a plurality of pictures included in the video;
- a trajectory calculating unit configured to calculate a plurality of trajectories by detecting, for each block including at least one pixel that is included in one of the received pictures, a motion of the block between two pictures included in the video, and concatenating detected motions for the plurality of pictures;
- a subclass classification unit configured to classify the calculated trajectories into a plurality of subclasses each of which is a set of similar trajectories;
- an inter-subclass approximate geodetic distance calculating unit configured to calculate, for each of the subclasses, an inter-subclass approximate geodetic distance which represents similarity between the subclass and another one of the subclasses, using an inter-subclass distance that is a distance including a minimum value of a linear distance between each of trajectories belonging to the subclass and one of trajectories belonging to the other one of the subclasses; and
- a data output unit configured to output data including at least the inter-subclass approximate geodetic distance calculated by said inter-subclass approximate geodetic distance calculating unit.

21. A moving object detection apparatus which detects a moving object in video by performing segmentation on an image to specify all or part of regions of the moving object in the video, said moving object detection apparatus comprising:
- a data input unit configured to receive an input of data including at least an inter-subclass approximate geodetic distance representing similarity between each of trajectories belonging to a subclass which is a set of similar trajectories in the video and one of trajectories belonging to another one of the subclasses that is different from the subclass and is a set of similar trajectories in the video; and
- a segmentation unit configured to perform segmentation by specifying, based on the inter-subclass approximate geodetic distance received by said data input unit, a set of subclasses including similar trajectories as one class.

* * * * *